United States Patent
Akutsu et al.

(10) Patent No.: US 12,354,311 B2
(45) Date of Patent: Jul. 8, 2025

(54) DATA COMPRESSION AND DECOMPRESSION SYSTEM AND METHOD THEREOF

(71) Applicant: Hitachi, Ltd., Tokyo (JP)

(72) Inventors: Hiroaki Akutsu, Tokyo (JP); Takahiro Naruko, Tokyo (JP); Akifumi Suzuki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 380 days.

(21) Appl. No.: 17/829,588

(22) Filed: Jun. 1, 2022

(65) Prior Publication Data

US 2022/0392117 A1   Dec. 8, 2022

(30) Foreign Application Priority Data

Jun. 8, 2021   (JP) .................................. 2021-095805

(51) Int. Cl.
  *G06T 9/00*      (2006.01)
  *G06T 3/4046*   (2024.01)

(52) U.S. Cl.
  CPC ............ *G06T 9/002* (2013.01); *G06T 3/4046* (2013.01)

(58) Field of Classification Search
  CPC ..... G06T 9/002; G06T 3/4046; G06N 3/0464; H04N 19/13; H04N 19/436
  See application file for complete search history.

(56) References Cited

U.S. PATENT DOCUMENTS

| | | | |
|---|---|---|---|
| 11,375,242 B1 * | 6/2022 | Said ..................... | H04N 19/119 |
| 2004/0218819 A1 * | 11/2004 | Satoh .................... | H04N 19/42 382/232 |
| 2010/0177828 A1 * | 7/2010 | Rubinstein ............ | H04N 19/11 711/E12.007 |
| 2011/0090950 A1 * | 4/2011 | Bush ..................... | H04N 19/12 375/240 |
| 2016/0248440 A1 | 8/2016 | Greenfield et al. | |
| 2019/0155684 A1 | 5/2019 | Akutsu et al. | |
| 2019/0251418 A1 | 8/2019 | Nakanishi et al. | |
| 2021/0084317 A1 * | 3/2021 | Makeev ................. | H04N 19/46 |
| 2022/0124376 A1 * | 4/2022 | Said ...................... | H04N 19/44 |

FOREIGN PATENT DOCUMENTS

| | | |
|---|---|---|
| JP | 2019-095913 A | 6/2019 |
| JP | 2019-140680 A | 8/2019 |

OTHER PUBLICATIONS

Japanese Office Action received in corresponding Japanese Application No. 2021-095805 dated Feb. 4, 2025.

\* cited by examiner

*Primary Examiner* — Charles T Shedrick
(74) *Attorney, Agent, or Firm* — MATTINGLY & MALUR, PC

(57) ABSTRACT

Both of a high compression ratio and a high processing speed are achievable. In a data compression and decompression system that includes a parallel processing device performing a plurality of processes in parallel, the parallel processing device divides original data into a plurality of data by a predetermined unit. The parallel processing device performs coding processes on the plurality of data in parallel using a predetermined model to create a plurality of coded data. The parallel processing device creates compressed data of the original data from the plurality of coded data.

15 Claims, 19 Drawing Sheets

FIG. 3

DATA STRUCTURE OF COMPRESSED DATA

| LARGE ITEM | SMALL ITEM | DATA (FORM) |
|---|---|---|
| CONFIGURATION INFORMATION | HEIGHT OF ORIGINAL IMAGE (H) | 512 (SCALAR VALUE) |
| | WIDTH OF ORIGINAL IMAGE (W) | 768 (SCALAR VALUE) |
| | BATCH NUMBER OF FM (B) | 6 (SCALAR VALUE) |
| | NUMBER OF CHANNELS OF FM ($C_3$) | 32 (SCALAR VALUE) |
| | NUMBER OF VERTICAL DIVISIONS ($D_h$) | 2 (SCALAR VALUE) |
| | NUMBER OF LATERAL DIVISIONS ($D_w$) | 3 (SCALAR VALUE) |
| | DIVISION HEIGHT ($T_h$) | 256 (SCALAR VALUE) |
| | DIVISION WIDTH ($T_w$) | 256 (SCALAR VALUE) |
| MAP INFORMATION | | 3, 2, 5, 8, ... (VECTOR VALUE (R)) |
| CODED DATA | | 0x243F, 0x546D, ... (VECTOR VALUE (M)) |
| ADDITIONAL INFORMATION OF ORIGINAL IMAGE | | EXIF OR THE LIKE |

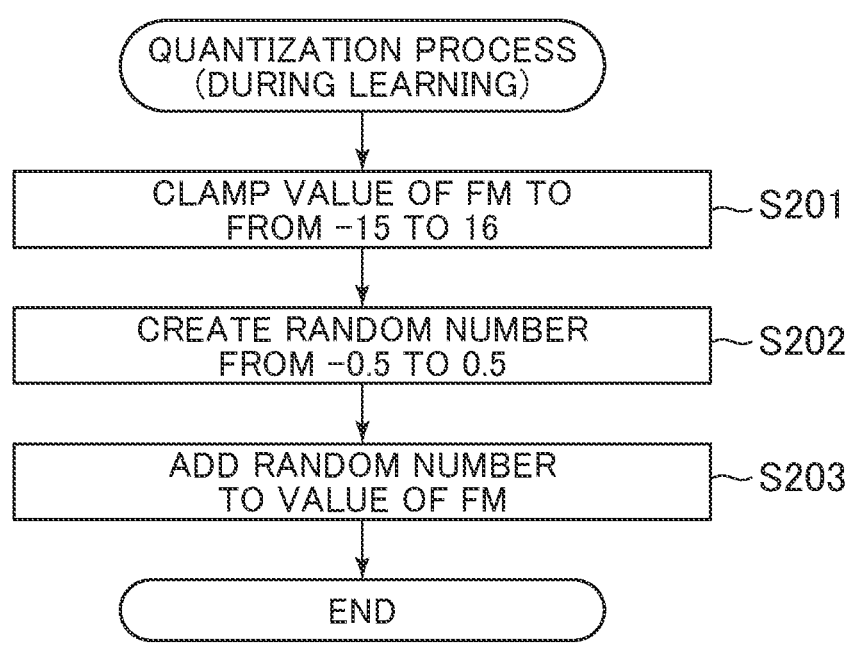

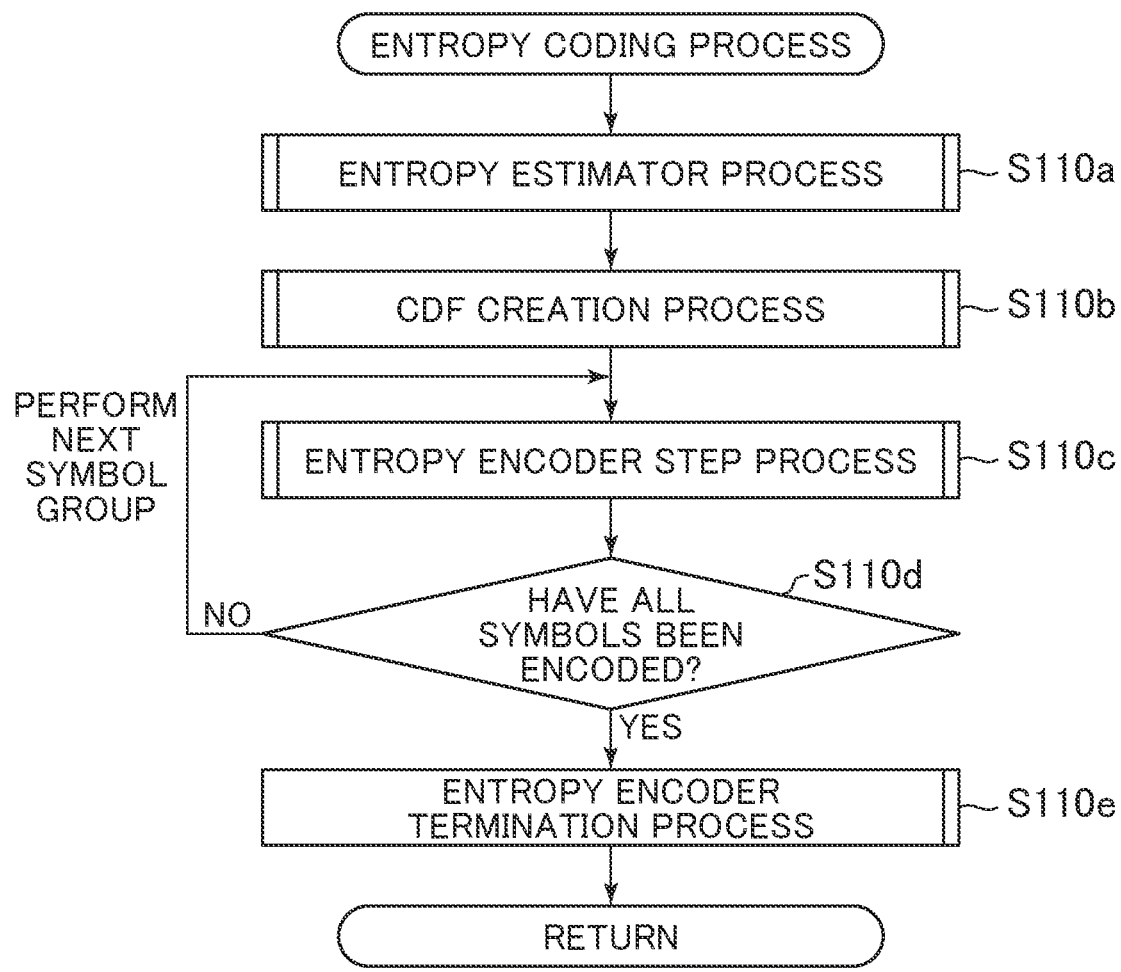

FIG. 9

| | CNN KERNEL STRUCTURE | ESTIMATION TARGET IN ONE-TIME STEP OF ITERATION: ONE LOCATION |
|---|---|---|
| (a) PIXEL CNN (CONVENTIONAL METHOD) | FIRST LAYER / SUBSEQUENT LAYERS | DEPEND ON VERTICAL DIRECTION AND HORIZONTAL DIRECTION |
| (b) SIMPLE LINED CAUSAL CNN (THIS EMBODIMENT) | FIRST LAYER / SUBSEQUENT LAYERS (NONE) | ESTIMATION TARGET IN ONE-TIME STEP OF ITERATION: SIMULTANEOUS PROCESS IN HORIZONTAL DIRECTION — NO DEPENDENCE ON HORIZONTAL DIRECTION |

▧ : EFFECTIVE PARAMETER
☐ : INVALID PARAMETER (ZERO MASKED)

▧ : ESTIMATION SOURCE TARGET
☐ : OUT OF TARGET
▨ : ESTIMATION DESTINATION TARGET

FIG. 10

```
Argorithm1 : get_cdf (mean, scale):
1:  f = calc_cdf (mean+0.5, scale) - calc_cdf (mean-0.5, scale)
2:  f = floor (f * (d - symbolnum)) + 1
3:  f[symbolnum-1] = d - sum (f[0:symbolnum-1])
4:  cdf = matmul (f, matrix)
5: return f, cdf
```

FIG. 11

```
Argorithm2 : encode_step (x, s, f, cdf, enc, p):
1: repeat k times: # for renormalization
2:   exist = clamp (x - x_u + 1) # to 0 or 1
3:   p = p + exist
4:   enc[p] = enc[p] + (x % n) * exist
5:   x = (1-exist)* x + exist * floor (x / n)

6: x = floor (x/f[s])*d + (x%f[s]) + cdf[s] # encode
7: return x, enc, p
```

FIG. 15

```
Argorithm3 : decode_step (x, f, cdf, enc, p):
1: repeat k times: # renormalize (fill to x)
2:    fill = clamp (L - x) * clamp(p)
3:    x = x + fill * (x * (n - 1) + enc[p])
4:    p = p - fill 5: s = symbol (x % d, cdf) # find symbol from probability
6: x = f[s] * floor (x / d) + (x % d) - cdf[s] # decode
7: return x, enc, p
```

DATA COMPRESSION AND DECOMPRESSION SYSTEM AND METHOD THEREOF

CROSS-REFERENCE TO RELATED APPLICATION

The present application claims priority from Japanese application JP2021-095805, filed on Jun. 8, 2021, the contents of which is hereby incorporated by reference into this application.

BACKGROUND

The present invention generally relates to a data compression and decompression system, for example, a compression and decompression process.

As a storage system that performs data compression and decompression, for example, there is a technique disclosed in Japanese Unexamined Patent Application Publication No. 2019-95913.

SUMMARY

For improvement in productivity in the industrial world, expectation to the Internet of things (IoT) is increasing, and IoT data (for example, data obtained from various kinds of devices) continue increasing. For example, multidimensional data (for example, an image and a moving image) created by an IoT device are enormous volume, highly efficiently transferring and accumulating the enormous volume of multidimensional data is thought to be requested, and a data compression technique is one of approaches for the solution.

Through use of an advanced model, such as a neural network, for the data compression technique, achievement in high compression ratio can be expected. However, a decrease in processing speed of compression or decompression has been a concern. Achieving both of a high compression ratio and a high processing speed is the object.

The object as described above is possibly present in a field other than the IoT.

In a parallel processing device, regarding data compression and decompression, a compression and decompression process is performed using an advanced model, such as a neural network, data is divided by a predetermined unit before a coding process, and the coding processes are processed in parallel.

Both of a high compression ratio and a high processing speed are achievable.

BRIEF DESCRIPTION OF THE DRAWINGS

FIG. 3 is a drawing illustrating an exemplary data structure of compressed data compressed by the compressor;

FIG. 7 is a flowchart depicting a quantization process (during learning) example;

FIG. 8 is a flowchart depicting details of an entropy coding process;

FIG. 9 is a drawing illustrating an outline of an example of an entropy estimator process;

FIG. 10 is a drawing illustrating an algorithm example of a CDF creation process;

FIG. 11 is a drawing illustrating an algorithm example of an entropy encoder step process;

FIG. 15 is a drawing illustrating an algorithm example of an entropy decoder step process;

DETAILED DESCRIPTION

Figure 1:
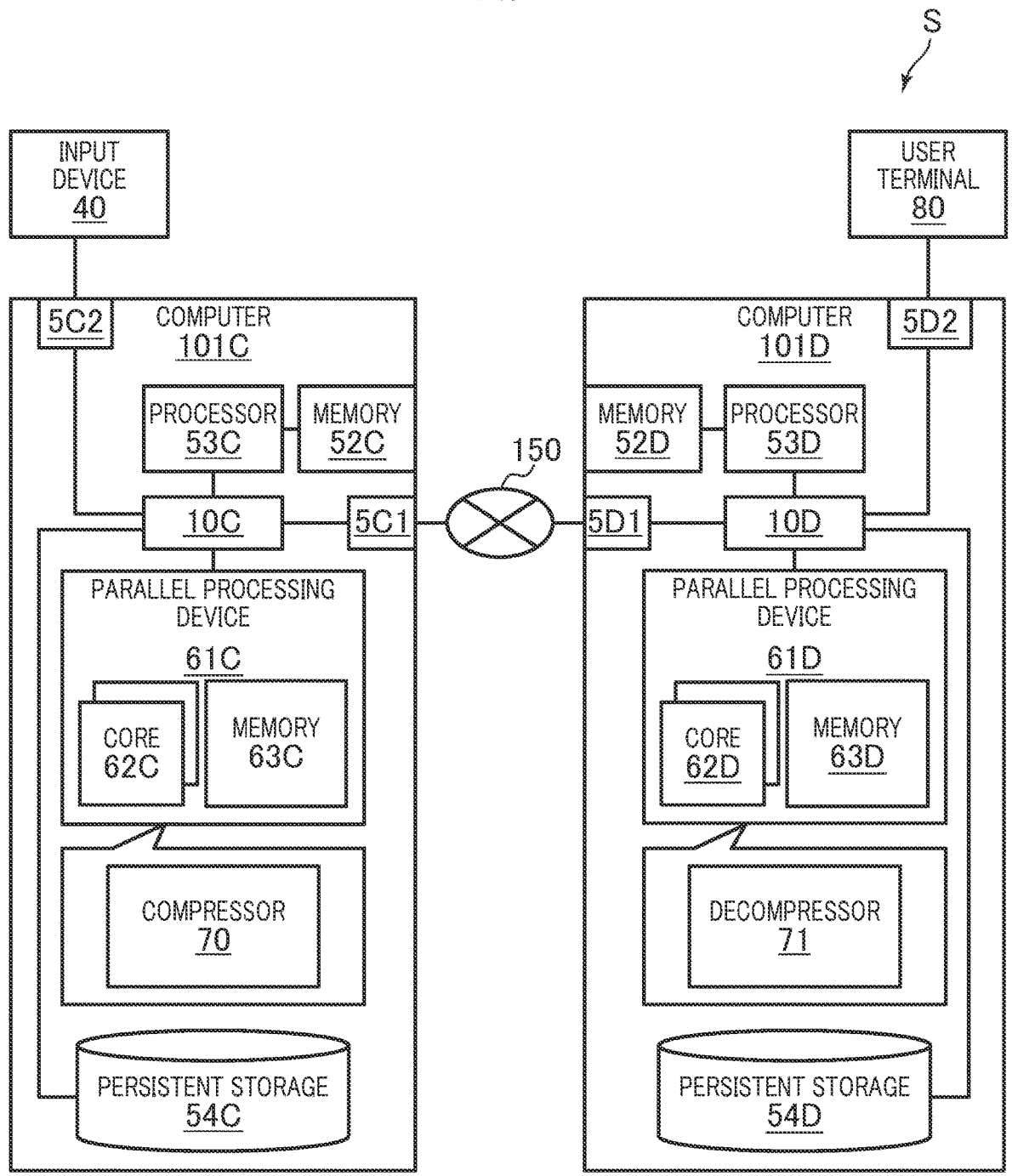
FIG. 1 is a drawing illustrating an exemplary configuration of a data compression and decompression system according to a first embodiment.

In the following description, an "interface device" may be one or more communication interface devices. One or more communication interface devices may be one or more of an identical type of communication interface devices (for example, one or more Network Interface Cards (NICs)). Alternatively, one or more communication interface devices may be two or more different types of communication interface devices (for example, a NIC and a Host Bus Adapter (HBA)).

Additionally, in the following description, a "memory" may be one or more memory devices and may be typically a main storage device. At least one memory device among the memories may be a volatile memory device or may be a non-volatile memory device.

Additionally, in the following description, a "persistent storage" is one or more persistent storage devices. The persistent storage device is typically anon-volatile storage device (for example, an auxiliary storage device), and specifically, for example, a Hard Disk Drive (HDD) or a Solid State Drive (SSD).

In the following description, a "storage" may be a physical storage, such as a persistent storage, or may be a logical storage associated with the physical storage.

In the following description, a "processor" is one or more processor devices. At least one processor device may be typically a microprocessor device, such as a Central Processing Unit (CPU). At least one processor device may be a single core or may be multiple cores. At least one processor device may be a processor core.

In the following description, a "parallel processing device" is an example of a device that can perform parallel processing. While the parallel processing device may be achieved by a CPU including a plurality of physical or virtual cores, but may be typically a hardware circuit, such as an Application Specific Integrated Circuit (ASIC), a Field-Programmable Gate Array (FPGA), or a Graphics Processing Unit (GPU).

Hereinafter, while information that allows obtaining an output for an input will be described by an expression, such as a "table xxx," the information may be data having any structure or may be a learning model, such as a neural network, that creates an output for an input. Therefore, the "table xxx" can be referred to as "information xxx." In the following description, a configuration of each table is one example, one table may be divided into two or more tables, and all or a part of two or more tables may be one table.

Hereinafter, functions as configuration members of a compressor or a decompressor (specifically, for example, an encoder filter, a Feature Map (FM) tiler, a FM untiler, an entropy encoder, an entropy decoder, a quantizer, and an entropy estimator) will be described. While these functions are achieved by the parallel processing device in this embodiment, a part of the functions may be achieved by executing a computer program by a processor. The description of each of the functions is one example, and a plurality of the functions may be integrated into one function or one function may be divided into a plurality of functions.

In the following description, a "data set" is a collection of one logical electronic data viewed from a program, such as an application program, and may be any of, for example, a record, a file, a key-value pair, and a tuple.

In the following description, to describe without distinction of an identical type of elements, the common part in the reference numeral is used, and with distinction of the identical type of elements, the reference numeral is used in some cases. For example, without distinction, computers are referred to as "computers 101" and with distinction, the computers 101 are referred to as like a "computer 101C" and a "computer 101D" in some cases. Additionally, a system including one or a plurality of the computers 101 can be referred to as a "computer system." The "computer" may be a physical computer, such as an on-premise type. The "computer" may be a cloud computer (for example, a device achieved on a system including a several types of calculation resources (for example, a processor and a memory). The "computer" may be a mobile device (for example, a smartphone and a laptop personal computer).

The following will describe some embodiments of the present invention. In any of the following embodiments, a configuration of lossy compression may be provided, and, for example, a configuration of lossless compression may be provided, for example, by without using a filter or a quantizer or by using a lossless filter.

In the following embodiments, a case where the computer of the present invention is applied to the storage will be described, but the present invention is not limited to this. The persistent storage can be omitted, and the present invention can be applied to a device that transmits and receives data, such as a communication device.

First Embodiment

FIG. 1 is a drawing illustrating an exemplary configuration of a data compression and decompression system S according to the first embodiment.

The data compression and decompression system S includes computers 101C and 101D. The computer 101C and the computer 101D communicate via a network 150 (for example, the Internet, a Wide Area Network (WAN), or a Local Area Network (LAN)). The computer 101 is, for example, a storage. The computer 101C includes a compressor 70, and the computer 101D includes a decompressor 71. One computer 101 may include both of the compressor 70 and the decompressor 71, and compression and decompression of data may be completed in one computer 101.

The computers 101C and 101D may have an identical hardware configuration or different hardware configurations. In this embodiment, to simplify the description, the hardware configurations of the computers 101C and 101D are identical. The hardware configuration of the computers 101 will be described using the computer 101C as an example.

The computer 101C includes interface devices 5C1 and 5C2 (an example of interface devices), a persistent storage 54C, a memory 52C, a processor 53C, a parallel processing device 61C, and an internal bus 10C that connects them. The interface devices 5C1 and 5C2, the persistent storage 54C, the memory 52C, and the parallel processing device 61C are, for example, communicatively connected to the processor 53C via the internal bus 10C.

The interface device 5C1 is connected to the network 150. The interface device 5C2 is connected to an input device 40. The input device 40 inputs data to the computer 101C. The input device 40 may be a sensor device (for example, an optical camera and a gravity sensor), may be a portable storage medium, or may be another computer.

To the parallel processing device 61C, compression target data input from the input device 40 via the interface device 5C2 is input with or without via the processor 53C. The parallel processing device 61C includes a memory 63C and a plurality of cores 62C. The parallel processing device 61C is achieved as the compressor 70. The compressor 70 (the parallel processing device 61C) compresses the compression target data in parallel. This allows compressing the compression target data at high speed. The compressed data is output from the parallel processing device 61C and is stored in the persistent storage 54C with or without via the processor 53C.

The memory 52C stores a computer program executed by the processor 53C and data input and output by the processor 53C.

The processor 53C reads the program from the memory 52C and executes it to perform at least a part of processes performed by the computer 101C. For example, the processor 53C reads the compressed data (data that has been compressed) stored in the persistent storage 54C from the persistent storage 54C and transmits the compressed data to the computer 101D via the interface device 5C1.

The computer 101D differs from the computer 101C, for example, as follows. The computer 101D includes an interface device 5D2 to which a user terminal 80 (for example, a personal computer and a smartphone) is connected. The computer 101D receives the compressed data via an interface device 5D1, and the compressed data is stored in a persistent storage 54D and/or a memory 52D (or is not stored in the persistent storage 54D) and is input to a parallel processing device 61D. The parallel processing device 61D is achieved as the decompressor 71. The decompressor 71 (the parallel processing device 61D) decompresses the compressed data in parallel. This allows decompressing the compressed data at high speed. The decompressed data is transmitted to the user terminal 80 via the interface device 5D2.

Compression target data may be any type. In this embodiment, the compression target data is image data representing an image (a still image). The image data is an example of N-dimensional tensor data (N is an integer of one or more). The image data as the compression target is input to the compressor 70. The image data input to the compressor 70 is referred to as "original image data" in some cases. The compressor 70 performs lossy compression on the original image data, and the decompressor 71 decompresses the lossy-compressed image data.

Note that, for example, when the computers 101C and 101D are the communication devices, a persistent storages 54 and 54D can be omitted. In this case, the original image data input to the computer 101C via the input device 40 is transmitted to the computer 101D after compression by the compressor 70. The computer 101D decompresses the compressed data received from the computer 101C in the decompressor 71 and then outputs it to the user terminal 80.

Figure 2:
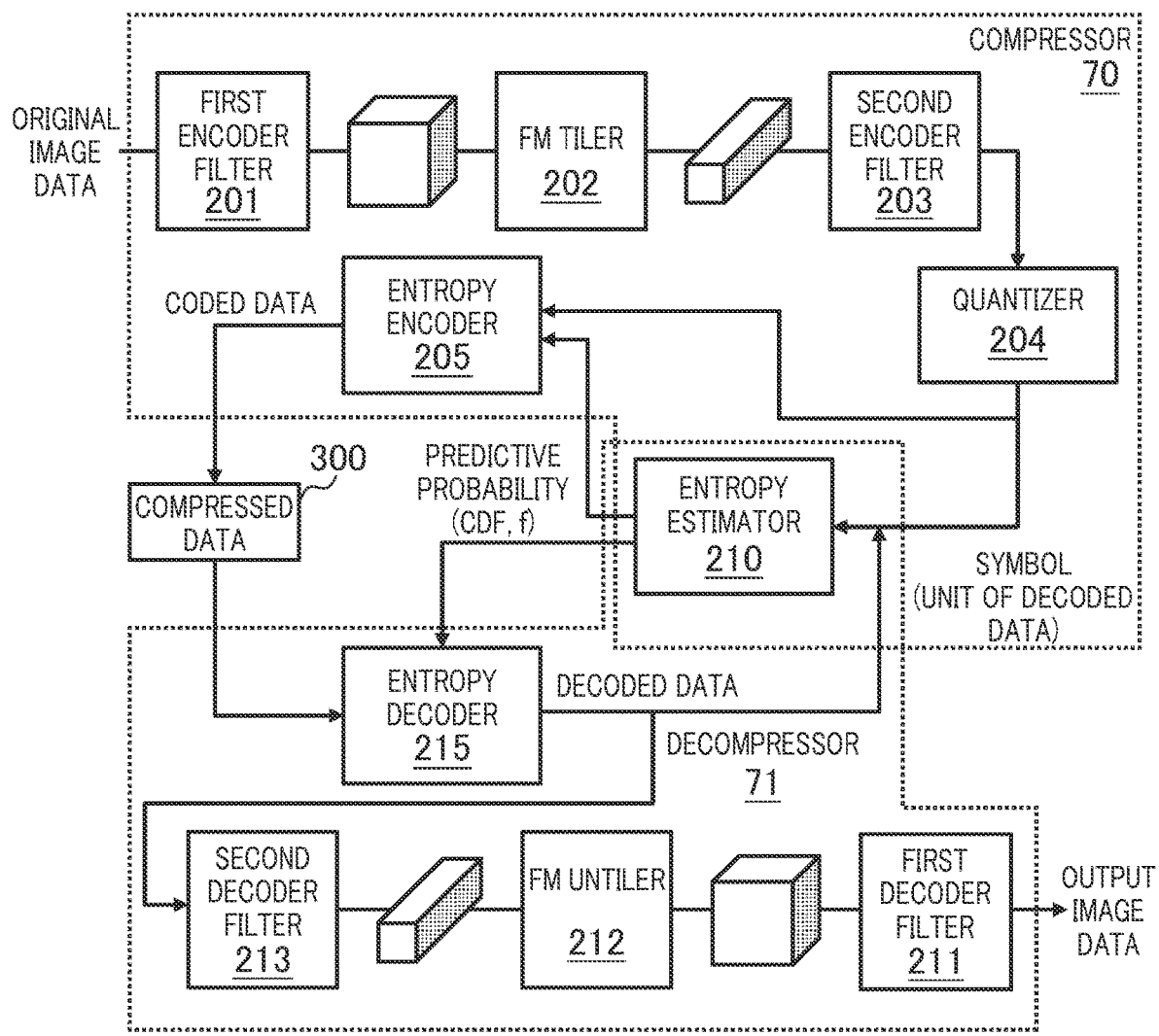
FIG. 2 is a drawing illustrating an exemplary configuration of a compressor and a decompressor according to the first embodiment.

FIG. 2 is a drawing illustrating an exemplary configuration of the compressor 70 and the decompressor 71 according to the first embodiment.

The compressor 70 includes a first encoder filter 201, a Feature Map (FM) tiler 202, a second encoder filter 203, a quantizer 204, an entropy encoder 205, and an entropy estimator 210. These configuration members are achieved on the parallel processing device 61C. Even when the entropy estimator 210 is a different entropy estimator, the entropy estimator 210 can configure an identical model by providing an identical type of distribution and parameters "mean" and "scale" and can output an identical predictive probability for an identical symbol.

The decompressor 71 includes a first decoder filter 211, an FM untiler 212, a second decoder filter 213, an entropy decoder 215, and the entropy estimator 210. These configuration members are achieved on the parallel processing device 61D.

A parallel processing device 61 divides the data stored in a memory 63 and performs a tensor operation by a plurality of cores 62. This increases the speed of the compression process (and the decompression process).

Each of the first encoder filter 201, the second encoder filter 203, the entropy encoder 205, the entropy estimator 210, the first decoder filter 211, the second decoder filter 213, and the entropy decoder 215 is configured including a convolutional neural network (CNN) in this embodiment, and specifically, for example, is configured of a multi-layer network including Residual Block. For example, the first encoder filter 201 and the second encoder filter 203 may be networks of decreasing in vertical/lateral directions, and the first decoder filter 211 and the second decoder filter 213 may be networks of extending in the vertical/lateral directions.

At least one of the first encoder filter 201, the second encoder filter 203, the entropy encoder 205, the entropy estimator 210, the first decoder filter 211, the second decoder filter 213, and the entropy decoder 215 may be a simple machine learning model other than the CNN (typically a model based on deep learning), for example, may be a lossless creation model, such as Gaussian Mixture Models (GMM), Hidden Markov Model (HMM), Stochastic Context-Free Grammar (SCFG), Generative Adversarial Nets (GAN), Variational Auto Encoder (VAE), and Flow, or may be genetic programming. Alternatively, model compression, such as Mimic Model, may be applied to reduce an information volume of the model. A process generally used in a compression process, such as Discrete Cosine Transform (DCT) and Wavelet conversion, may be used. Further, a prediction process by Optical Flow or the like may be used.

FIG. 3 is a drawing illustrating an exemplary data structure of compressed data 300 compressed by the compressor 70. Respective values shown in FIG. 3 are one example.

The image data before compression input to the compressor 70, the image data after decompression output from the decompressor 71, and data input and output by the first encoder filter 201, the second encoder filter 203, the entropy estimator 210, the first decoder filter 211, and the second decoder filter 213 are generalized as four-dimensional tensor data in this embodiment. Respective dimensions of the tensor data are constituted of a batch, the number of channels, a height (a vertical width), and a width (a lateral width).

A "height of an original image H" means the height (the vertical width) of the original image. A "width of an original image W" means the width (the lateral width) of the original image. The "batch number of FM B" means the number of parallels of a Feature Map (FM) after quantization output by the second encoder filter 203 and thereafter processed by the quantizer 204, and is a natural number. B=1 means no parallel. "The number of channels of FM $C_3$" means the number of channels of the feature map after quantization. Here, regarding the image data before compression input to the compressor 70 and the image data after decompression output from the decompressor 71, for example, in the case of an RGB image, the batch number is 1, the number of channels is 3 (denoted as $C_1$), the height is H, and the width is W.

As illustrated in FIG. 3, the compressor 70 codes the original image data to create the compressed data 300 in which configuration information of a "height of original image (H)," a "width of original image (W)," the "batch number of FM (B)," "the number of channels of FM ($C_3$)," "the number of vertical divisions (Dh)," "the number of lateral divisions (Dw)," a "division height (Th)," and a "division width (Tw)," "map information," "coded data," and "additional information of original image" are made correspond to and recorded.

Among them, the "height of original image (H)," the "width of original image (W)," and the "additional information of original image" are information succeeded from the original image data. The "batch number of FM (B)," "the number of channels of FM ($C_3$)," "the number of vertical divisions (Dh)," "the number of lateral divisions (Dw)," the "division height (Th)," and the "division width (Tw)" are information given by the FM tiler 202.

The "Map information" is present by the number of streams (R=B×C) of "coded data," and is information (an N-dimensional vector) representing a position of each stream and a data length of "coded data" in the compressed data. The "coded data" is binary data having a length M coupled excluding an unused part in each stream of R entropy coded data.

According to this embodiment, a filter of the compressor 70 is separated into the first encoder filter 201 (the encoder filter at the former part) and the second encoder filter 203 (the encoder filter at the latter part), and the FM tiler 202 is present between the first encoder filter 201 and the second encoder filter 203.

Figure 4:
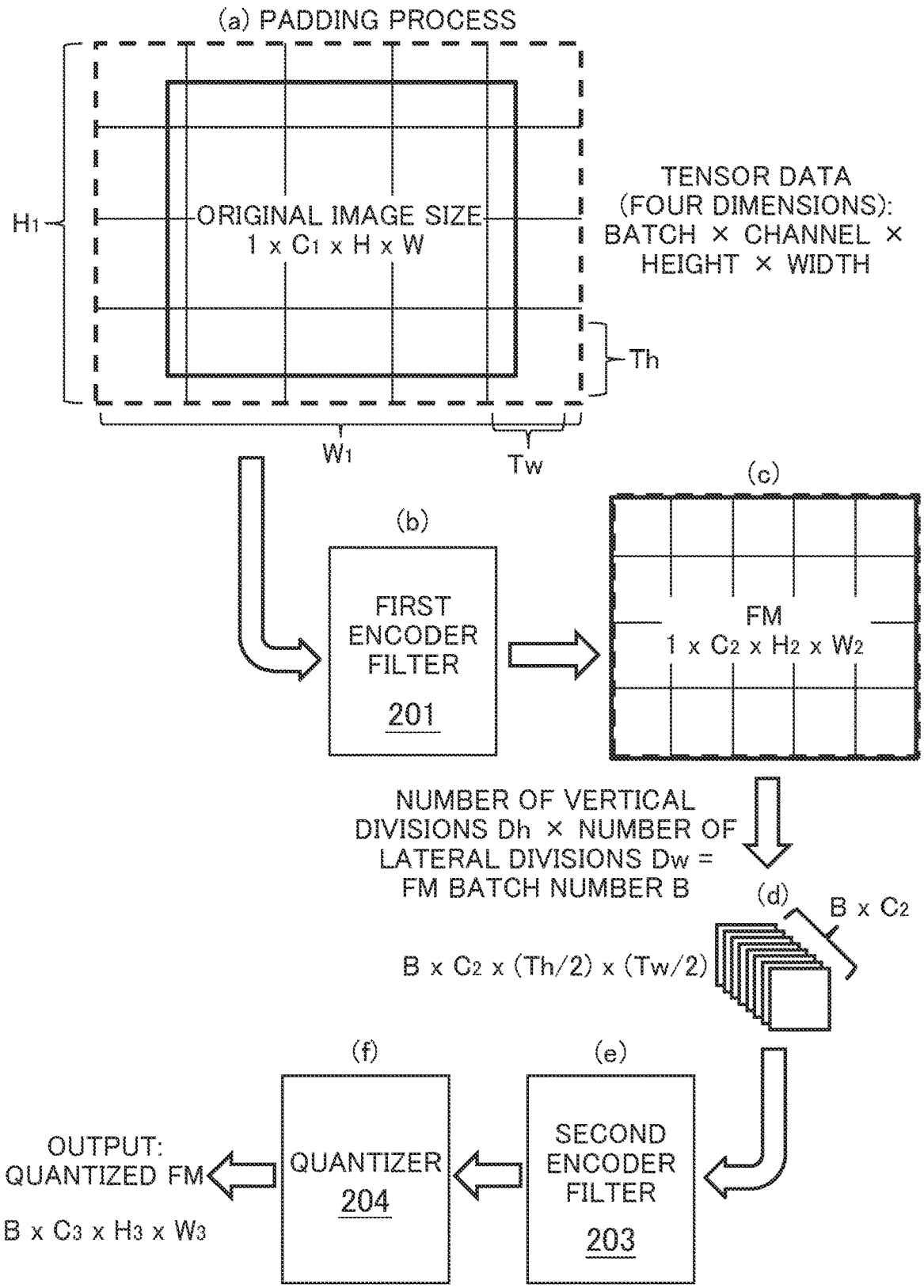
FIG. 4 is a drawing for describing FM tiling.

With reference to FIG. 4, FM tiling performed by the FM tiler 202 will be described. FIG. 4 is a drawing for describing the FM tiling.

The original image data in four-dimensional tensor is input to the first encoder filter 201. The first encoder filter 201 prepares images before first encoder filter process by the number of channels=$C_1$ in the memory 63C. The "$C_1$ images before first encoder filter process" may be $C_1$ channel images expressed by the original image data ($C_1$ original images). Alternatively, as illustrated in (a) in FIG. 4, the "$C_1$ images before first encoder filter process" may be $C_1$ images ($C_1$ images each having predetermined height and width) as a result of performing a padding process on each of $C_1$ channel images of the original image data. For example, when a division height Th, a division width Tw, the number of vertical divisions Dh, and the number of lateral divisions Dw (namely, the batch number of FM B=Dh×Dw), the padding process performs padding of data on the original image such that the original image has the size multiples of the division height Th×division width T. Hereinafter, the size of the image after padding is defined as H1 in vertical and W1 in lateral.

In (b) in FIG. 4, the first encoder filter 201 performs the first encoder filter process on the image data representing $C_1$ images before first encoder filter process. Specifically, the first encoder filter 201 receives the image data representing $C_1$ images before first encoder filter process and outputs a feature map (a first FM) representing $C_2$ images after first encoder filter process illustrated in (c) in FIG. 4 without changing the dimension or the batch number of the image data. That is, the image data representing $C_1$ images before first encoder filter process is converted into the FM representing a tensor after $C_2$ first encoder filter processes by the CNN of the first encoder filter 201. Typically, $C_2$ is larger than $C_1$, a height H2 and a width $W_2$ of the first FM are smaller than the height $H_1$ and the width $W_1$ of the image before first encoder filter process. For example, in FIG. 4, the dimension of the image before first encoder filter process is $1 \times C_1 \times H_1 \times W_1$ and the dimension of the first FM is $1 \times C_2 \times (H_1/2) \times (W_1/2)$.

The first FM is input to the FM tiler 202. The FM tiler 202 divides each of $C_2$ images after first encoder filter process expressed by the image data in the batch direction in accordance with the number of vertical divisions Dh and the number of lateral divisions Dw (namely, the batch number of FM B=Dh×Dw) without changing the dimension of the input image data. That is, each of $C_2$ tensors after first encoder filter process is divided into B images in a tile form (for example, B is an integer of two or more). Therefore, as illustrated in (d) in FIG. 4, the dimension of the FM (the FM after tiling) output from the FM tiler 202 becomes $B \times C_2 \times (Th/2) \times (Tw/2)$.

Figure 5:
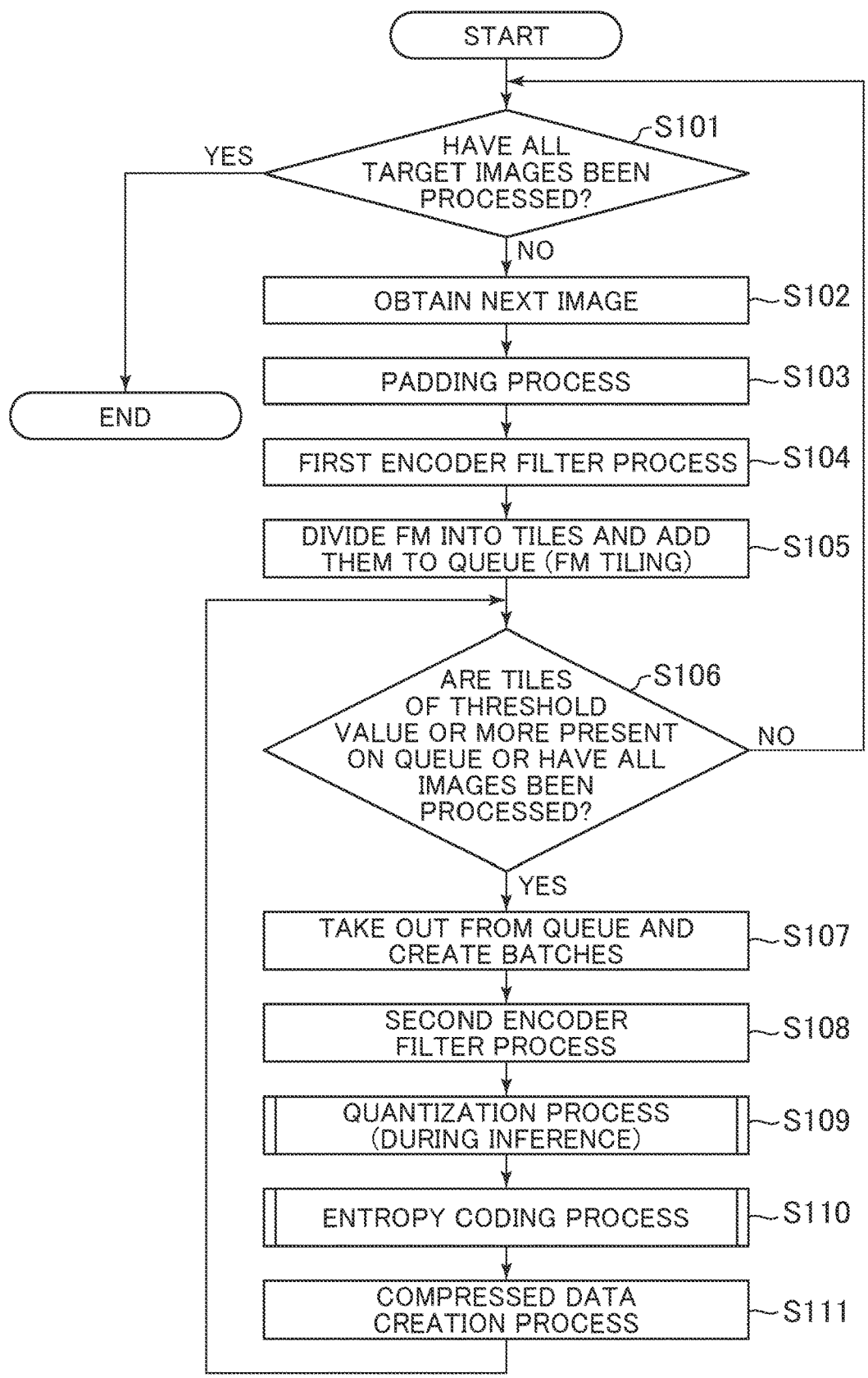
FIG. 5 is a flowchart depicting a compression process example according to the first embodiment.

(e) in FIG. 4, the second encoder filter 203 performs a second encoder filter process of the FM after tiling. Specifically, the second encoder filter 203 receives the FM after tiling output from the FM tiler 202 and performs the second encoder filter processes by the batch number B on a set of $C_2$ tensors expressed by the data in parallel by the plurality of cores 62C. The second encoder filter 203 outputs the data (a plurality of the divided feature maps) as the result of the second encoder filter process. After that, the quantizer 204, the entropy encoder 205, the entropy estimator 210, the entropy decoder 215, and the second decoder filter 213 perform the processes by the batch number B in parallel by the plurality of cores 62C. In this example, while the batch number is described to be divided from one original image, as shown in FIG. 5 later, the tiles may be collected from a plurality of images and may be processed in further more batches to improve parallelism.

The data output from the second encoder filter 203 is input to the quantizer 204. In (f) in FIG. 4, the quantizer 204 creates the quantized feature map (Feature Map (FM)) of the data. For example, when the data contains floating points, the quantizer 204 rounds them to integers to reduce data. Thus, the quantized feature map is created. That is, the data output from the quantizer 204 is, for example, array data of integer values. Additionally, in the following description, the form of the four-dimensional tensor data of the quantized feature map according to this embodiment is expressed by $[B \times C_3 \times H_3 \times W_3]$, and for example, may be $C_3=32$, $H_3=Th/16$, and $W_3=Tw/16$. $C_3$ may be increased to $C_3=64$ and $C_3=128$ or may be reduced according to a required bit rate or the like.

The data (the quantized feature map) output from the quantizer 204 is input to the entropy estimator 210. Using the feature map, the entropy estimator 210 predicts a probability distribution f of each symbol as a data unit of compression/decompression using information stored for prediction with an autoregressive model or the like or another probability prediction or using both of them together to calculate a Cumulative Distribution Function (CDF) of the probability distribution f. The probability distribution f and the cumulative distribution function CDF are referred to as predictive probabilities (CDF, f).

The entropy encoder 205 calculates a function that compares a probability, such as a cross entropy, based on the predictive probability of each symbol and the correct probability of occurrence of each symbol calculated directly from the feature map. The cross entropy of the predictive probability of symbol and the actual probability of occurrence of symbol becomes an information volume of coding by the entropy encoder 205. In view of this, the prediction accuracy by the entropy estimator 210 affects a compression ratio.

The data output from the quantizer 204 and the data output from the entropy estimator 210 are input to the entropy encoder 205. The entropy encoder 205 codes the symbol based on the symbol based on the input feature map and the predictive probability by the entropy estimator 210. The data coupled excluding an unused part from the coded data (bit stream data) is output as the compressed data 300. The output compressed data 300 is output from the parallel processing device 61C to the processor 53C. The compressed data 300 may be stored in the persistent storage 54C by the processor 53C or may be transferred to the computer 101D and stored in the persistent storage 54D by a processor 53D.

The decompression is performed in the procedure inversed to the compression of the original image data. That is, the compressed data 300 output from the entropy encoder 205 and the predictive probability output from the entropy estimator 210 are input to the entropy decoder 215. The entropy decoder 215 outputs a plurality of decoded data by the number of streams $R=(B \times C_3)$ based on the compressed data 300 and the predictive probability. The decoded data is also input to the entropy estimator 210 to be used for prediction of the symbol. This is because of the following reason. While decoding is iterated for each symbol group by a predetermined unit (the number of vertical divisions Dh×the number of lateral divisions Dw×the number of channels of FM $C_3$×lateral width of quantized feature map $W_3$) in Simple Lined Causal CNN described later in this embodiment, the entropy estimator 210 receives the symbol group previously decoded and sequentially creates the predictive probability of the current symbol group.

A plurality of decoded data decoded by the entropy decoder 215 are input to the second decoder filter 213. The second decoder filter 213 performs the second decoder filter process on the plurality of decoded data. Specifically, the second decoder filter 213 receives the tensors having the sizes $(B \times C_3 \times H_3 \times W_3)$ of the plurality of decoded data output from the entropy decoder 215, performs filtering (the second decoder filter process) by the batch number B in parallel by the plurality of cores 62C, and converts them into of a tensor having a size $(B \times C_2 \times (Th/2) \times (Tw/2))$.

The FM untiler 212 integrates the tensor data in the batch dimension of the data in the tile form in accordance with the number of vertical divisions Dh and the number of lateral divisions Dw (namely, the batch number of FM B=Dh×Dw). That is, the FM untiler 212 integrates the tensors in the tile forms for each of the batch number B of each of $C_2$ tensors after the second decoding into one. Therefore, the size of tensor data output from the FM untiler 212 is, for example, $1 \times C_2 \times H_2 \times W_2$. Hereinafter, this will be referred to as a FM after untiling.

The first decoder filter 211 performs the first decoder filter process on the FM after untiling. Specifically, the first decoder filter 211 receives the FM after untiling, converts the FM after untiling into output image data representing $C_1$ images after first decoder filter process, and outputs it.

In this embodiment, since the first encoder filter 201 performs the first encoder filter process and then the FM tiler 202 performs the batch division, a receptive field of the neural network is not completely separated compared with the related art that performs the compression process after dividing the image into batches. Accordingly, an effect of reducing an artifact at the divided portion of the batches can be expected.

While in this embodiment, the process is performed with the size (the division width) of tiling as the fixed size, several types of division widths may be provided, the division width may be changed according to a property of each region in the input image, and the processes may be parallelized for each type of the division width for optimization. In the case, the division width is made correspond to the region in the image and is recorded to the compressed data.

FIG. 5 is a flowchart depicting a compression process example according to the first embodiment. While the following will describe an example in which the computer 101C performs the compression process, the computer 101D including the compressor 70 can perform the compression process similarly. The compression process is performed by the processor 53C, the parallel processing device 61C, and the compressor 70 achieved on the parallel processing device 61C at a timing, for example, when the compression target data is input to the computer 101C.

First, at Step S101, the processor 53C determines whether all images as the compression target have been processed. When all images as the compression target have been processed (YES at Step S101), the processor 53C terminates the compression process. When not all images as the compression target have been processed (NO at Step S101), the process moves to Step S102.

At Step S102, the processor 53C obtains the next image data as the compression target and stores it in the memory 63C in the parallel processing device 61C. Next, at Step S103, the core 62C in the parallel processing device 61C performs the padding process (see FIG. 4) on the image data as the compression target stored in the memory 63C. The padding process can be omitted.

Next, at Step S104, the first encoder filter 201 performs the first encoder filter process on the image data as the compression target stored in the memory 63C to create the FM. Next, at Step S105, the FM tiler 202 performs FM tiling that divides the FM created at Step S104 into tiles (the division height Th, the division width Tw) by the predetermined batch number of FM B (the number of vertical divisions Dh×the number of lateral divisions Dw), and stores the created tiles (a plurality of the divided feature maps) in a queue in the compressor 70.

Next, at Step S106, the processor 53C determines whether the tiles by a predetermined threshold value or more are present on the queue or all images as a compression target have been processed. When the tiles by the predetermined threshold value or more are present on the queue or all images as the compression target have been processed (YES at Step S106), the processor 53C moves the process to Step S107. When the tiles by the predetermined threshold value or more are not present on the queue or not all images as the compression target have been processed (NO at Step S106), the processor 53C returns the process to Step S101.

At and after Steps S107 to S111, parallel processing is performed with the batch number Bm× the number of channels C as the maximum number of parallels for data stream.

At Step S107, the second encoder filter 203 takes out the tiles from the queue and creates the batches by the batch number Bm based on the above-described predetermined threshold value. Here, the processes for a plurality of input images are collected as the batch and the processes can be performed in parallel. Next, at Step S108, the second encoder filter 203 performs the second encoder filter process on the batches created at Step S107. Next, at Step S109, the quantizer 204 performs a quantization process (during inference) on the batches on which the second encoder filter process has been performed at Step S108. Details of Step S109 will be described later with reference to FIG. 6.

Next, at Step S110, the entropy encoder 205 performs an entropy coding process on the batches on which the quantization process has been performed at Step S110. Details of Step S110 will be described later with reference to FIG. 8.

Next, at Step S111, the entropy encoder 205 performs a compressed data creation process. Details of the compressed data creation process will be described later with reference to FIG. 12. When Step S111 is terminated, the processor 53C returns the process to Step S106.

Figure 6:
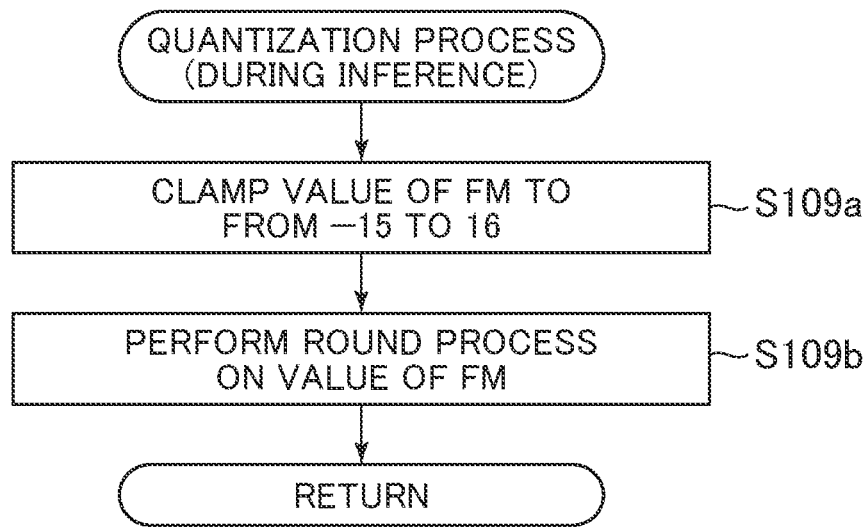
FIG. 6 is a flowchart depicting a detailed example of a quantization process (during inference)

FIG. 6 is a flowchart depicting a detailed example of the quantization process (during inference) at Step S109 in FIG. 5. Generally, when only the quantizer simply performs a round process on a value, the range of the value as the output result are indeterminate. The indeterminate range of the value as the output result makes it difficult to calculate the CDF by tensor operation in the entropy estimator 210 at the latter part. Therefore, the quantizer 204 performs "clamp" on the output such that the range is restricted to 32 symbols in a predetermined range from −15 to 16 as one example.

First, at Step S109a, the quantizer 204 performs "clamp" on the value of FM in the predetermined range, for example, from −15 to 16. Next, at Step S109b, the quantizer 204 performs the round process on the value of FM.

FIG. 7 is a flowchart depicting a quantization process (during learning) example. The quantizer 204 performs "clamp" on the output at a learning stage of the model of the compressor 70 to restrict output to 32 symbols in the predetermined range, for example, from −15 to 16. The predetermined range of "clamp" during learning and the predetermined range of "clamp" during inference are identical.

First, at Step S201, the core 62C in the parallel processing device 61C performs "clamp" on the value of FM as the learning target in the predetermined range, for example, from −15 to 16. Next, at Step S202, the core 62C creates a random number from −0.5 to 0.5. Next, at Step S203, the core 62C adds the random number created at Step S202 to the value of FM as the learning target.

FIG. 8 is a flowchart depicting a detailed example of the entropy coding process at Step S110 in FIG. 5. The entropy coding process receives the plurality of images and performs cueing on the tiles as the process target so as to allow processing even an image having a small size at a predetermined multiplicity, and allow processing even a large image by a predetermined unit.

First, at Step S110a, the entropy estimator 210 performs an entropy estimator process. Details of the entropy estimator process will be described later with reference to FIG. 9. Next, at Step S110b, the entropy estimator 210 performs a CDF creation process. Details of the CDF creation process will be described later with reference to FIG. 10.

Next, at Step S110c, the entropy encoder 205 performs an entropy encoder step process. Details of the entropy encoder step process will be described later with reference to FIG. 11. Additionally, since Tensor ANS described later will be used, encoding is performed in an order inversed to that of an entropy decoding process depicted in FIG. 14 in this embodiment. Therefore, at Steps S110a and S110b, different from the sequential decoding process depicted in FIG. 14, the CDFs as the encode target are calculated together preliminarily.

Next, at Step S110d, the entropy encoder 205 determines whether all symbols have been encoded. When all symbols have been encoded (YES at Step S110d), the entropy encoder 205 moves the process to Step S110e, and when not all symbols have been encoded (NO at Step S110d), the entropy encoder 205 returns the process to Step S110c. At Step S110c to which the process has been returned, the entropy encoder 205 selects the next symbol group and performs the entropy encoder step process.

At Step S110e, the entropy encoder 205 performs a renormalization process that renormalizes data remaining on the queue by the predetermined number of times.

FIG. 9 is a drawing illustrating an outline of an example of the entropy estimator process at Step S110a in FIG. 8. FIG. 9 illustrates a comparison between the entropy estimator process using Simple Lined Causal CNN in this embodiment and the conventional method using Pixel CNN. In this embodiment, a weight of CNN kernel is appropriately determined to ensure performing entropy prediction by CNN for coding in parallel in the horizontal direction and eliminate redundancy of the calculation, thus achieving the high-speed process.

As illustrated in (a) in FIG. 9, the entropy estimator process by the conventional method (Pixel CNN) uses weights of pixels adjacent to pixels as the estimation target in the respective longitudinal direction (vertical direction) and the lateral direction (horizontal direction) in the CNN kernel for prediction, and uses the previous prediction result for the current prediction, and therefore iteration of prediction needs to be repeated for each one process.

Meanwhile, as illustrated in (b) in FIG. 9, the entropy estimator process according to this embodiment (Simple Lined Causal CNN) constitutes the size of the CNN kernel with the size in the vertical direction as 1, for example, 1×3 and performs an insertion process of a predetermined given initial value (for example, zero) into one row, especially the above during tensor input to the CNN kernel to perform input with the input tensor shifted in the vertically downward direction by one stage, thus ensuring using the pixels limited to the pixels above the pixels as the estimation target for prediction. That is, the entropy of the pixel as the estimation target is predicted based on only the pixels in the vertical direction with respect to the arrangement direction of the pixels as the estimation target. This eliminates dependence of prediction in the lateral direction and the current prediction is performed without requiring the previous prediction result, and therefore the process can be collectively performed. That is, during decoding, the prediction of [Bm× $C_3 \times 1 \times W_3$] can be simultaneously performed on the quantized feature map. Accordingly, the number of repetitions of iteration required for prediction during decoding can be only H3 times. On the other hand, during encoding, the process can be simultaneously performed on the whole quantized feature map. Furthermore, since an invalid parameter is unnecessary, compared with the Pixel CNN, a zero multiplication process and an addition process, which are originally unnecessary, can be reduced.

Additionally, in the related art, a context predictor was created using a plurality of hierarchies. However, in this embodiment, using a 2D CNN kernel to be used as one layer, the context predictor can be simplified.

FIG. 10 is a drawing illustrating an algorithm example of the CDF creation process at Step S110b in FIG. 8. In this algorithm, a parameter of a probability distribution as an output result of the entropy estimator process is input, and a cumulative distribution function CDF for each symbol and a predictive probability f for each symbol are calculated. This specification describes an algorithm example in notation of Python (registered trademark) like.

Although the predictive probability f of each symbol is originally a continuous function, it needs to be converted into integer representation for entropy coding. The integer representation of the predictive probability f is to generate the predictive probability of each symbol such that the sum becomes d (equivalent to 1 in usual probability expression) with the integer value of one or more when a denominator coefficient d is given. Additionally, the cumulative distribution function CDF is accumulative expression of f.

In this embodiment, with the output result of the entropy estimator process as the parameter, the probability distribution is obtained using a probability distribution function for predetermined symbol prediction. As the probability distribution function for symbol prediction, for example, a gauss distribution is used. However, the probability distribution function is not limited to the gauss distribution, and another probability distribution function, such as a logistics distribution, can be used. In the case of gauss distribution, mean corresponds to the parameter "mean" and dispersion corresponds to the parameter "scale." In the case of logistics distribution, the position corresponds to the parameter "mean" and the scale corresponds to the parameter "scale." Additionally, the output result of the entropy estimator process may be used only for a part of the parameters in the distribution. For example, in the gauss distribution, for example, "mean" is fixed to a constant (for example, 0) and the output result of the entropy estimator process is used only for "scale," and thus the process may be simplified to achieve an increase in speed. For example, in this embodiment, it is assumed that the two types of parameters, "mean" and "scale," are used, the form of tensor of the output result of the entropy estimator process is [Bm×(2*$C_3$)×$H_3$×$W_3$], and the forms of the predictive probability f and the cumulative distribution function CDF, with the total number of symbols as S, become five dimensions [Bm×$C_3$×$H_3$×$W_3$×S].

When the total number of symbols is S and, for example, the values that the symbols can take are integers from −15 to 16, "symbolnum" in FIG. 10 becomes "symbolnum"=32. Additionally, "calc_cdf" is a function that receives, for example, the two types of tensors of parameters "mean" and "scale" in the gauss distribution to calculate the cumulative probability from a position with a value −∞ to a position with a value 0 of a random variable in the probability distribution of the input parameter. In the case of gauss distribution, for example, calculation using an error function is possible.

In the process at the first line in FIG. 10, variations of the values of the parameters "mean" are preliminarily prepared in number of "symbolnum," and f for each parameter "mean" is calculated in the parallel processing, thus ensuring multiplex calculation of CDF using the tensor operation as shown in the fourth line.

In the second line in FIG. 10, the integer value off is calculated for each variation of the values of the parameters "mean" in number of "symbolnum." Here, since the minimum value of probability is 1, 1 is added to the last.

In the third line in FIG. 10, since the summed value of f in number of "symbolnum" is d, the probability of the last symbol is calculated by subtracting the sum of f up to the symbol before the last one from the denominator coefficient d.

In the fourth line in FIG. 10, the CDF is calculated with "matmul" (a matrix operation). The matrix "matrix" used here is a triangular matrix of "symbolnum"×"symbolnum" in a narrow sense, and this allows creating the CDF from f in parallel by tensor operation.

In the fifth line in FIG. 10, the created f and CDF are output.

FIG. 11 is a drawing illustrating an algorithm example of the entropy encoder step process at Step S110c in FIG. 8. In this embodiment, Tensor ANS that implement Asymmetric Numeral Systems (ANS) by tensor operation is used. Similarly to FIG. 10, d in FIG. 11 denotes the denominator coefficient, L denotes the maximum code length, k denotes the number of repetitions, and n denotes a normalized coefficient. Hereinafter, a variable representing the tensor will be described. The parentheses after the variable name represent the form of the tensor in this embodiment. In the first line in FIG. 11, an argument x[$Bm \times C_3$] represents a state variable during encode, s [$Bm \times C_3$] represents the target symbol, f [$Bm \times C_3 \times S$] represents a predictive probability of each symbol by the entropy estimator 210, CDF [$Bm \times C_3 \times S$] represents a cumulative probability density distribution of each symbol, enc [$Bm \times C_3 \times N$] represents a data stream of the encode target, and p [$Bm \times C_3$] represents a pointer (the current position of the encoding process, and an effective data amount). N in the definition of "enc" is the length of data stream and is sufficiently long. One element of the data stream is $\log_2(n)*N$ bits and constituted in number of N at the maximum. For example, $N=H_3 \times W_3$ may be employed. In ANS, generally, for efficient code calculation, the upper limit value of the state variable x is determined, and a control is performed such that data having a predetermined size ($\log_2(n)$ bits for the normalized coefficient n) is written to the data stream and removed from x to set the range of the value x to be $(n*L) > x \geq L$. The process is generally referred to as "renormalize." x_u [$Bm \times C_3$] in the algorithm is the upper limit value of x in the control and can be calculated by $n*(L/d)*f$ [s].

The first line in FIG. 11 shows that the second to fifth lines are repeated by k times.

In the related art, a conditional branch for "renormalize" target determination is necessary. On the other hand, in the proposed method of this embodiment (Tensor ANS), as shown in the second line in FIG. 11, whether it is the "renormalize" target is determined by the use of an existence value "exist" created by "clamp." As shown in the third line in FIG. 11, update of p can be processed by the simple sum with "exist." Then, as shown in the fourth line in FIG. 11, from the product of the existence value "exist" and the remainder when the state x is divided by the normalized coefficient n, the process including a necessity for performing "renormalize" can be processed by product-sum operation for each of elements on the tensor. This eliminates the need for conditional branch for "renormalize" target determination and allows high speed multiple processing by tensor operation. Specifically, the Tensor ANS allow simultaneously processing $Bm \times C_3$ data streams in parallel, and the above-described FM tiler or the like allows dramatically improving the parallelism, thereby allowing increasing the speed the process.

Here, "clamp" is a process that restricts the target value in a range of 0 to 1, and specifically, the value less than 0 is converted into 0 and the value larger than 1 is converted into 1. Especially, in the range used by the proposed method in this embodiment, the value is the integer, and therefore the result of "clamp" becomes 0 or 1.

The method described above eliminates the need for conditional branch for "renormalize" and allows high speed multiplex of entropy coding on the tensor operation.

Additionally, while p is designated as the index for "enc" in the fourth line in FIG. 11, as the implementation, "scatter_add" can be used. "scatter_add" is a process to create the tensor found by designating the index and adding the predetermined tensor.

As an access method with other indices, such as f and "CDF," "gather" can be used. "gather" is a process that designates the index for use and creates a tensor as a collection of the designated indices. These processes allows $Bm \times C_3$ data streams to be processed in parallel. As another method, by a process that creates "one-hot-vector" of these indices and calculates the product operation and the sum for each element to ensure tensor operation.

Regarding a "symbol" process that searches for a corresponding symbol from a given probability y based on CDF, a range of the value found by subtracting y from CDF is restricted from 0 and 1 using "clamp," and then the sum is calculated to calculate the symbol (the index of CDF).

As described above, implementing all operations by the tensor operation allows achieving multiplex operation in the dimension, such as the batch and the channel.

Figure 12:
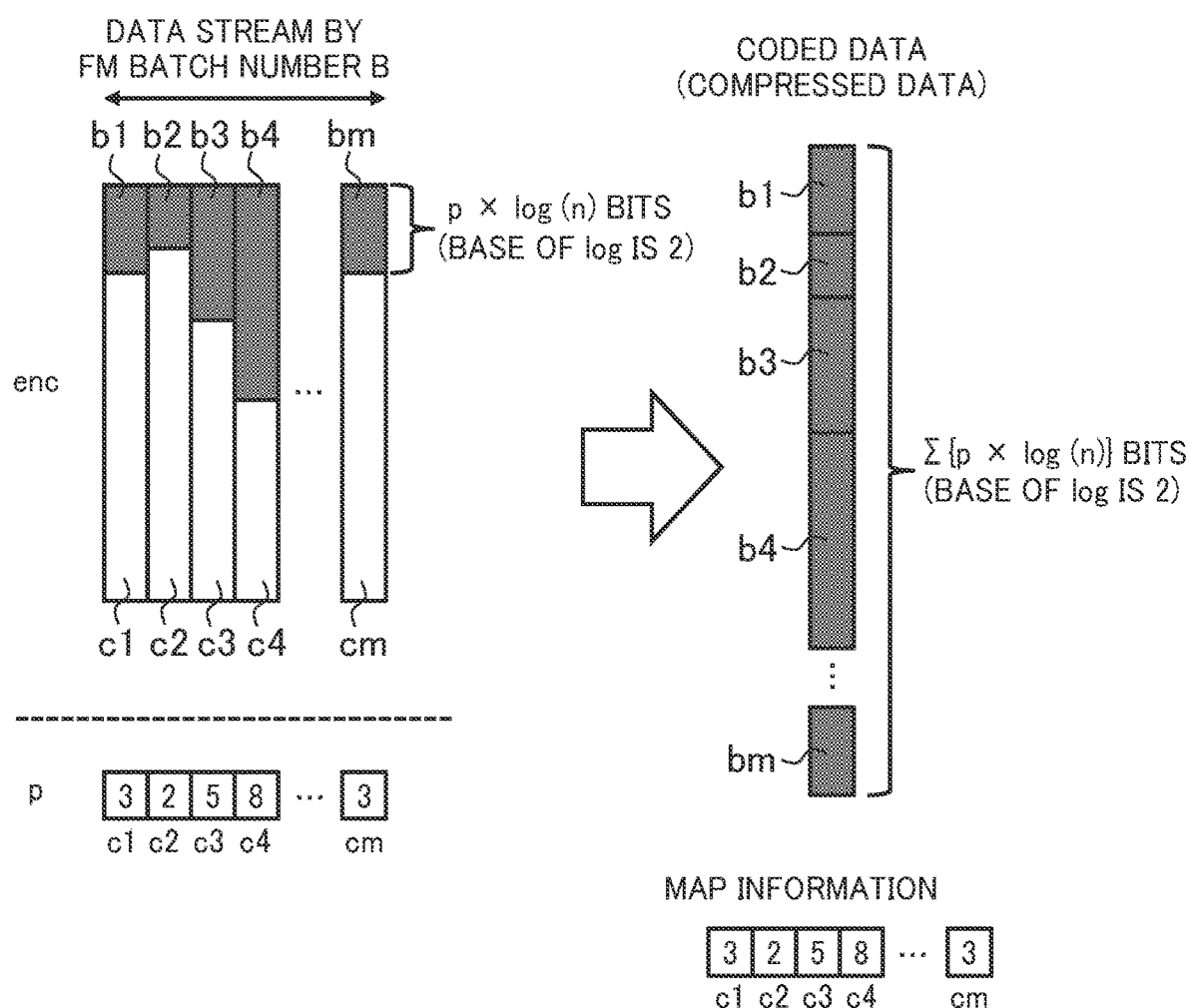
FIG. 12 is a drawing illustrating an outline of an example of a compressed data creation process.

FIG. 12 is a drawing illustrating an outline of an example of the compressed data creation process at Step S111 in FIG. 5.

For example, as illustrated in FIG. 11, unused part data c1 to cm included in the tensor data enc obtained in the entropy encoder step process are shifted forward, coded part data b1 to bm (compressed tiles) are connected to create coded data (compressed data). Additionally, a length p of each of the coded part data b1 to bm is defined as map information (see FIG. 3).

Note that during decoding the coded data, the coded part data b1 to bm of the respective coded data are taken out from the map information, the unused part data c1 to cm are added to obtain the tensor data enc.

Figure 13:
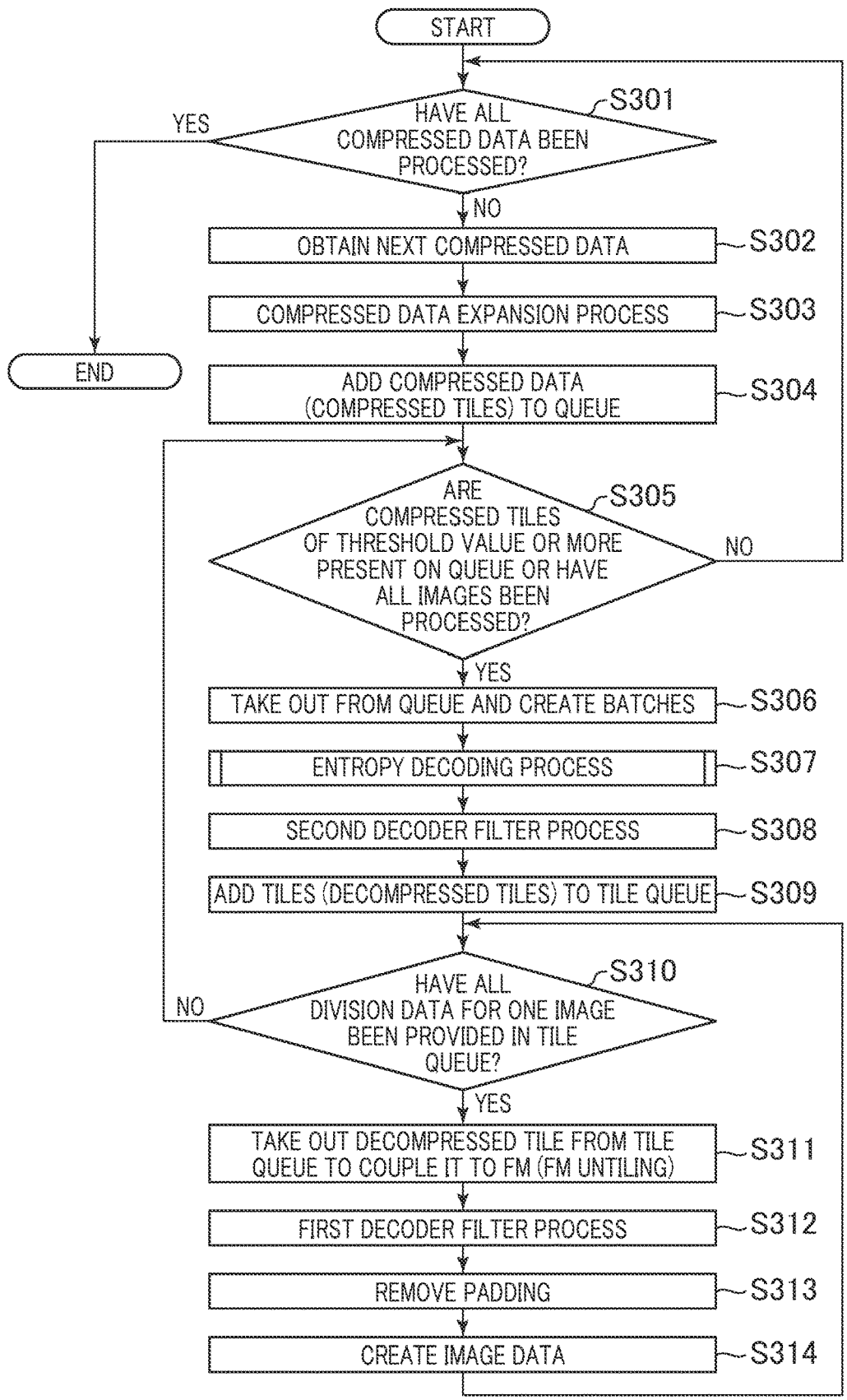
FIG. 13 is a flowchart depicting a decomposition process example according to the first embodiment.

FIG. 13 is a flowchart depicting a decomposition process example according to the first embodiment. While the following will describe an example in which the computer 101D performs the decomposition process, the computer 101C including the decompressor 71 can perform the decomposition process similarly. The decompression process is performed by the processor 53D, the parallel processing device 61D, and the decompressor 71 achieved on the parallel processing device 61D at a timing, for example, when the decompression target data is input to the computer 101D.

First, at Step S301, the processor 53D determines whether all compressed data as the decompression target have been processed. When all compressed data as the decompression target have been processed (YES at Step S301), the processor 53D terminates the decompression process. When not all compressed data as the decompression target have been processed (NO at Step S301), the process moves to Step S302.

At Step S302, the processor 53D obtains the next compressed data as the decompression target and stores it in a memory 63D in the parallel processing device 61D. Next, at Step S303, a core 62D in the parallel processing device 61D expands the compressed data as the decompression target stored in the memory 63D based on the map information and disassembles it into compressed tiles (coded batches). This process is a process inverted to the compressed data creation process illustrated in FIG. 12.

Next, at Step S304, the processor 53D adds the compressed tiles obtained at Step S304 to the queue in the decompressor 71.

Next, at Step S305, the processor 53D determines whether the compressed tiles by a predetermined threshold value or more are present on the queue or all images as the decompression target have been processed. When the compressed tiles by the predetermined threshold value or more are present on the queue or all images as the decompression target have been processed (YES at Step S305), the processor 53D moves the process to Step S306. When the compressed tiles by the predetermined threshold value or more are not present on the queue or not all images as the decompression target have been processed (NO at Step S305), the processor 53D returns the process to Step S310.

After that, at Steps S306 to S309, the parallel processing is performed in the data stream by the batch number Bm×the number of channels C.

At Step S306, the entropy decoder 215 takes out the compressed tiles from the queue and creates the batches by the batch number Bm based on the above-described predetermined threshold value. Here, similar to the compression process, a plurality of input image data can be simultaneously processed. Next, at Step S307, the entropy decoder 215 performs the entropy decoding process on the batches created at Step S306. Details of Step S307 will be described later with reference to FIG. 14.

Next, at Step S308, the second decoder filter 213 performs the second decoder filter process on the batches on which the entropy decoding process has been performed at Step S308. The second decoder filter process receives the quantized feature map and performs the second decoder filter processes in parallel by the plurality of cores 62D.

Next, at Step S309, the FM untiler 212 stores the decompressed tiles at Step S309 in a tile queue (a queue for tiles).

Next, at Step S310, the FM untiler 212 determines whether all division data for one image have been provided in the tile queue. When all division data for one image have been provided in the tile queue (YES at Step S310), the FM untiler 212 moves the process to Step S311. When not all division data have been provided (NO at Step S310), the FM untiler 212 returns the process to Step S305.

At Step S311, the FM untiler 212 takes out one decompressed tile from the tile queue to couple it to the FM (FM untiling). Next, at Step S312, the first decoder filter 211 performs the FM untiling at Step S311, and obtains image data produced by performing the first decoder filter process on the tensor data restored to the state before the division. Next, at Step S313, when the padding process has been performed on the original image data before compression, the core 62D in the parallel processing device 61D removes the padding from the image data obtained by the first decoder filter process at Step S312.

Next, at Step S314, the core 62D in the parallel processing device 61D creates the decompressed image data and outputs it. When Step S314 is terminated, the core 62D in the parallel processing device 61D returns the process to Step S310.

Figure 14:
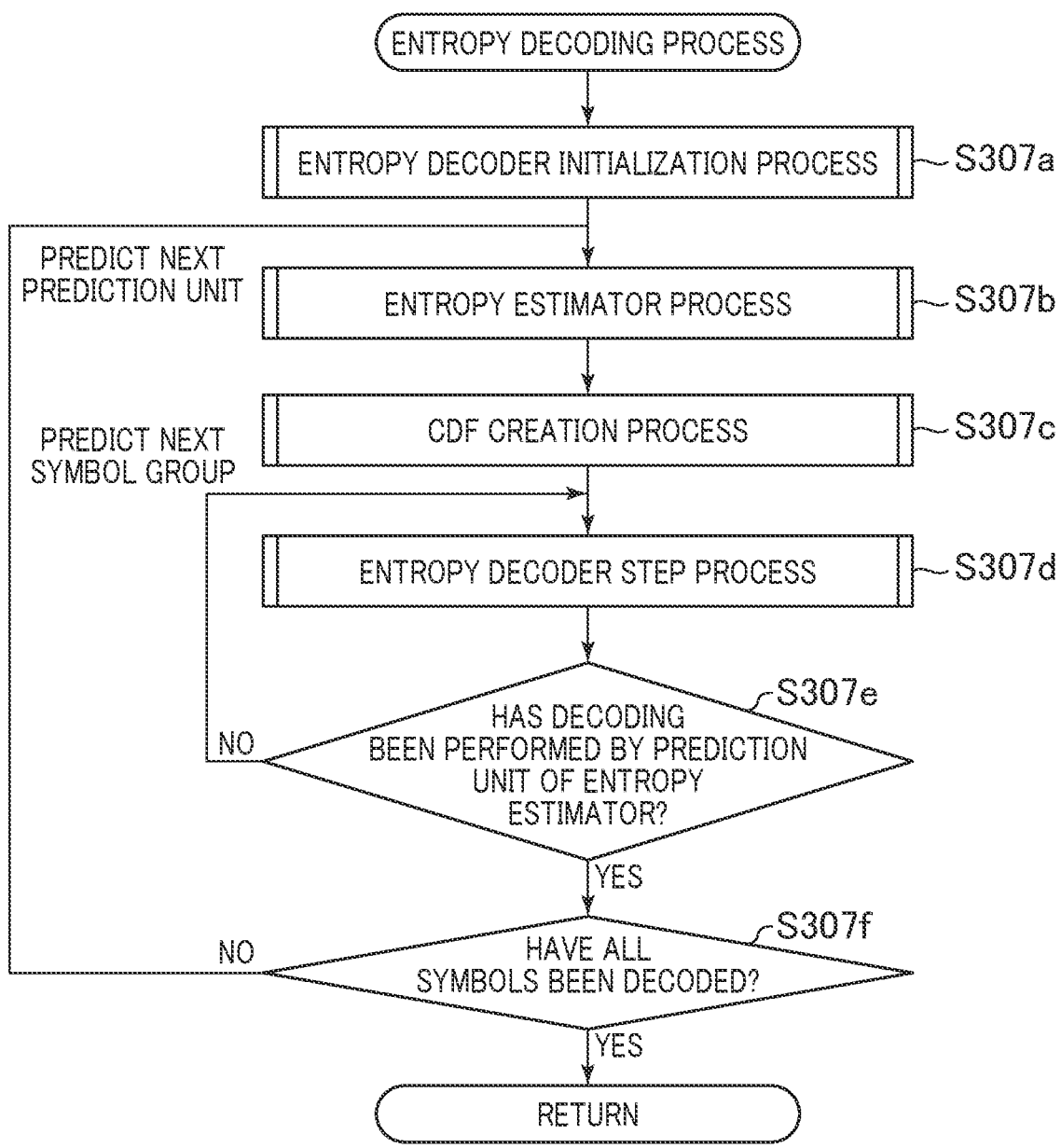
FIG. 14 is a flowchart depicting a detailed example of an entropy decoding process.

FIG. 14 is a flowchart depicting a detailed example of the entropy decoding process.

First, at Step S307a, to initialize the encoded data to the argument x (similar to the one shown in FIG. 11), the entropy decoder 215 performs renormalization during encoding by a predetermined number of times.

Next, at Step S307b, the entropy estimator 210 performs the entropy estimator process. The entropy estimator process at Step S307b is a process similar to Step S110a in FIG. 8 and FIG. 9.

Next, at Step S307c, the entropy estimator 210 performs the CDF creation process. The CDF creation process at Step S307c is a process similar to Step S110b in FIG. 8 and FIG. 10.

Next, at Step S307d, the entropy decoder 215 performs the entropy decoder step process. Details of the entropy decoder process will be described later with reference to FIG. 15.

Next, at Step S307e, the entropy decoder 215 determines whether decoding has been performed by the prediction unit of the entropy estimator 210. When decoding has been performed by the prediction unit of the entropy estimator 210 (YES at Step S307e), the entropy decoder 215 moves the process to Step S307f. When decoding has not been performed by the prediction unit of the entropy estimator 210 (NO at Step S307e), the entropy decoder 215 returns the process to Step S307d to decode the next symbol group. In this embodiment, as illustrated in FIG. 9, since the parallel processing is performed on one row as the prediction unit by the entropy estimator 210, the loop of Steps S307d and S307e is repeated.

At Step S307f, the entropy decoder 215 determines whether all symbols have been decoded. When all symbols have been decoded (YES at Step S307f), the entropy decoder 215 moves the process to Step S308 in FIG. 13, and when not all symbols have been decoded (NO at Step S307f), the entropy decoder 215 returns the process to Step S307b to predict the next prediction unit.

FIG. 15 is a drawing illustrating an algorithm example of the entropy decoder step process at Step S307d in FIG. 14.

The first line in FIG. 15 shows that the second to fourth lines are repeated by k times. "fill" in the second line in FIG. 15 is a variable representing whether the "renormalize" process needs to be performed, similarly to the algorithm during encoding, and only the tensor operation can be implemented by utilizing it. "clamp(p)" in the second line is a process to prevent performing the "renormalize" process again when p is zero, and this suppresses an invalid "renormalize" process and update of p to a negative value. As described above, implementing all operations by tensor operation allows achieving multiplex operation in the dimension, such as the batch and the channel, similarly to during encoding. Additionally, since all operations are implemented by tensor operation, programming specialized in a special parallel processing device is unnecessary, it can be easily implemented on middleware for machine learning on which the tensor operation is implemented, and parallelism can be effectively provided easily in the parallel processing device.

Additionally, to obtain high speed performance, it is important for the proposed method in this embodiment to adjust the denominator coefficient d, the normalized coefficient n, and the maximum code length L as the parameters. This is because when the number of times k of "renormalize" increases by an influence from these values being the maximums, this results in an increase in amount of calculation. Generally, k can be calculated by k=ceil(log(d)/log (n)). For example, at $d=2^{12}$, $n=2^8$, and $L=2^{16}$, the influence on the compression ratio is small, and the number of times of k of "renormalize" can be reduced. In this case, the procedure of "renormalize" is sufficient by performing k=twice, and therefore an influence on the processing speed is small.

Additionally, in this embodiment, the CNN may be used in, for example, the first encoder filter, the second encoder filter, the first decoder filter, the second encoder filter, and the entropy estimator. However, in the learning, by calculating cross entropy between the probability distribution calculated by the parameter output from the entropy estimator and the value of FM output from the encoder, a theoretical average bit rate is calculated in the manner of ensuring differentiation. Additionally, a distortion of the input image by encoder and the output image by the decoder (for example, PSNR or MS-SSIM, or besides, may be an image quality index implemented in the manner of ensuring differentiation) is calculated. Thus, learning that optimizes the trade-off between both of the average bit rate and the distortion by end-to-end by, for example, a Lagrangian optimizer can be performed. Since the learning reduces the artifact at the boundary of tiles, the use of the image data larger than the size of the original data corresponding to the tiles (the division width of the tiles) as learning data is preferred.

In this embodiment, the first encoder filter, the second encoder filter, the first decoder filter, and the second encoder filter having a large amount of product-sum operation may be implemented by high speed operation with low accuracy (for example, an operation with half-precision floating point), and the entropy estimator having a small amount of product-sum operation may be implemented by highly accurate operation for efficient process.

Second Embodiment

The second embodiment will be described. Then, the differences with the first embodiment will be mainly described, and description of points common to the first embodiment will be omitted or simplified.

Figure 16:
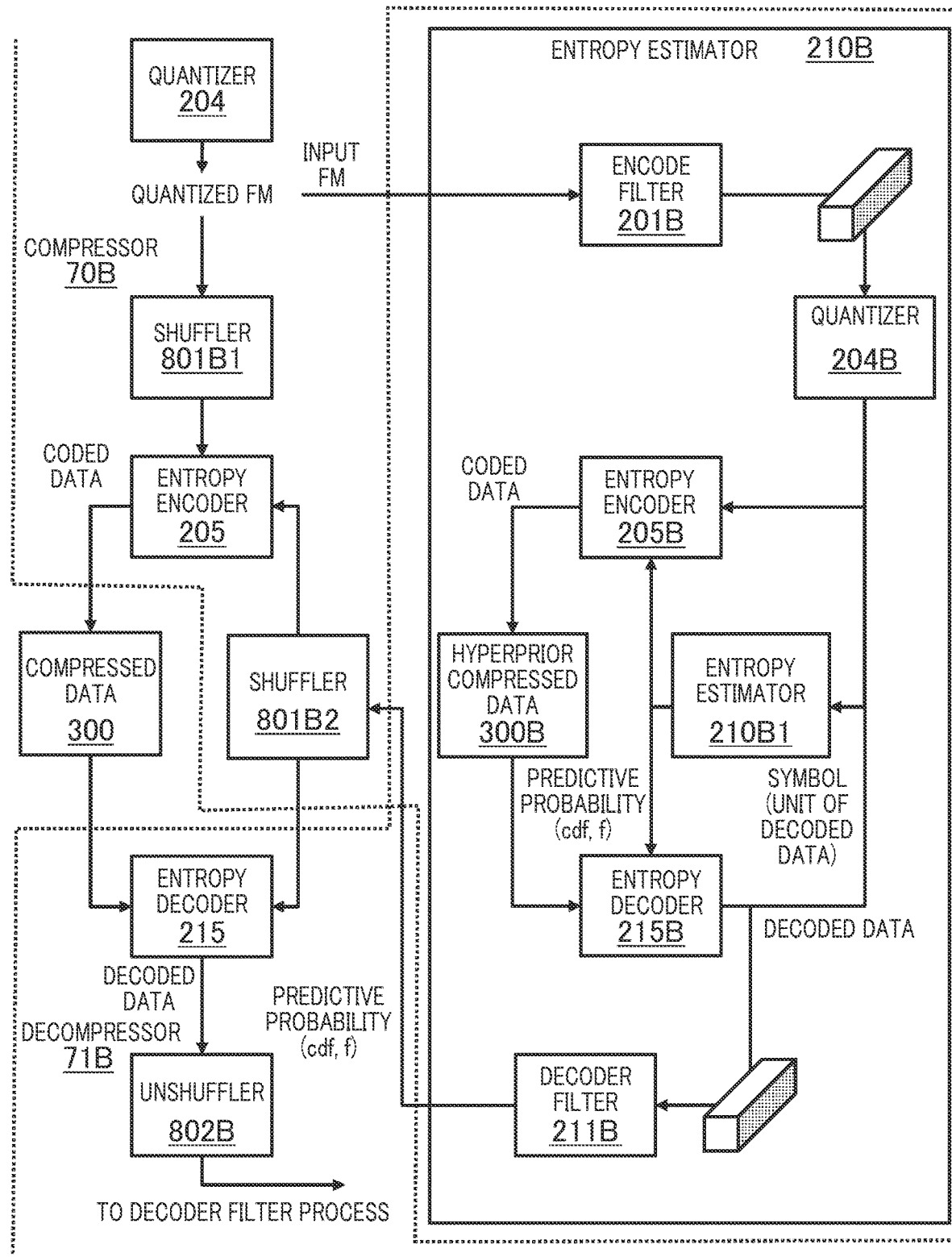
FIG. 16 is a drawing illustrating an exemplary configuration of an entropy estimator according to a second embodiment and a part of related compressor and decompressor.

FIG. 16 is a drawing illustrating an exemplary configuration of an entropy estimator 210B and a part of related compressor 70B and decompressor 71B according to the second embodiment. Compared with the compressor 70 and the decompressor 71 of the first embodiment, the compressor 70B and the decompressor 71B include the entropy estimator 210B instead of the entropy estimators 210. Additionally, compared with the compressor 70 of the first embodiment, the compressor 70B includes a shuffler 801B1 between the quantizer 204 and the entropy encoder 205, and a shuffler 801B2 between the entropy estimator 210B, the entropy encoder 205, and the entropy decoder 215, respectively. The shuffler 801B1 and the shuffler 801B2 may be identical.

Additionally, the decompressor 71B includes an unshuffler 802B between the entropy decoder 215 and the second decoder filter 213.

The entropy estimator 210B includes an encoder filter 201B, a quantizer 204B, an entropy encoder 205B, an entropy estimator 210B1, an entropy decoder 215B, and a decoder filter 211B.

Different from the Lined Causal CNN in FIG. 9, the encoder filter 201B predicts the predictive probability (CDF, f) of the quantized FM (input FM) input from the quantizer 204 by hyperprior.

The encoder filter 201B performs an encoder filtering process on the input FM. Similarly to the quantizer 204, the quantizer 204B quantizes the FM on which the encoder filtering process has been performed by the encoder filter 201B. The entropy estimator 210B1 receives the FM quantized by the quantizer 204B and predicts the predictive probability (CDF, f). The entropy estimator 210B1 predicts the predictive probability (CDF, f) using a context model of the Lined causal CNN illustrated in (b) in FIG. 9 or a simple static probability distribution.

The entropy encoder 205B obtains coding information, such as a cross entropy, based on the correct probability of occurrence of each symbol directly calculated from the FM quantized by the quantizer 204B and the predictive probability (CDF, f) predicted by the entropy estimator 210C. The entropy encoder 205B outputs the coding information as hyperprior compressed data 300B.

The entropy decoder 215B receives the predictive probability (CDF, f) from the entropy estimator 210B1 and performs the entropy decoder process on the hyperprior compressed data 300B to obtain decoded data. The decoded data of the symbol of the previous decoding target is input to the entropy estimator 210B1 for estimation of the predictive probability (CDF, f) of the current decoding target symbol.

The decoder filter 211B performs the decoder filtering process on the decoded data by the entropy decoder 215B and outputs the predictive probability (CDF, f) corresponding to the input FM.

The shufflers 801B1 and 801B2 randomly shuffle the respective input FMs and predictive probabilities (CDF, f) corresponding to the input FMs so as to be the identical orders. As long as being the reproducible method, the method of shuffle may be any method. Based on the predictive probability (CDF, f), the order may be changed by a method, such as bin packing.

The entropy encoder 205 performs the entropy encoder process on the quantized FMs in the order of the FMs and the predictive probabilities changed by the shufflers 801B1 and 801B2 and creates the compressed data 300. The entropy decoder 215 decodes the compressed data 300 in the order of the predictive probabilities changed by the shuffler 801B2 and creates decoded data.

The unshuffler 802B returns the order of symbols of the decoded data decoded by the entropy decoder 215 to the order before being shuffled by the shufflers 801B1 and 801B2.

Thus, when using the method of creating the hyperprior, the predictive probabilities of a plurality of symbols are obtained at once. Therefore, the random shuffle allows uniformizing the average entropy of each batch as the division unit, and allows reducing an overhead as the information volume of map information.

For example, by performing a predetermined amount of "dropout" on the FM during training of the neural network for compression/decompression, a model that is robust against a slight error in value of FM can be learnt. Thus, the map information retains only the mean values of the pointers p of all streams, and the FM in which data at the position equal to or more than the mean value is set as the predetermined value. Thus, data can be decoded, and the data capacity of the map information can be considerably small.

Third Embodiment

The third embodiment will be described. Then, the differences with the first embodiment will be mainly described, and description of points common to the first embodiment will be omitted or simplified. The third embodiment will describe a case where image data in a JPEG format is treated.

Figure 17:
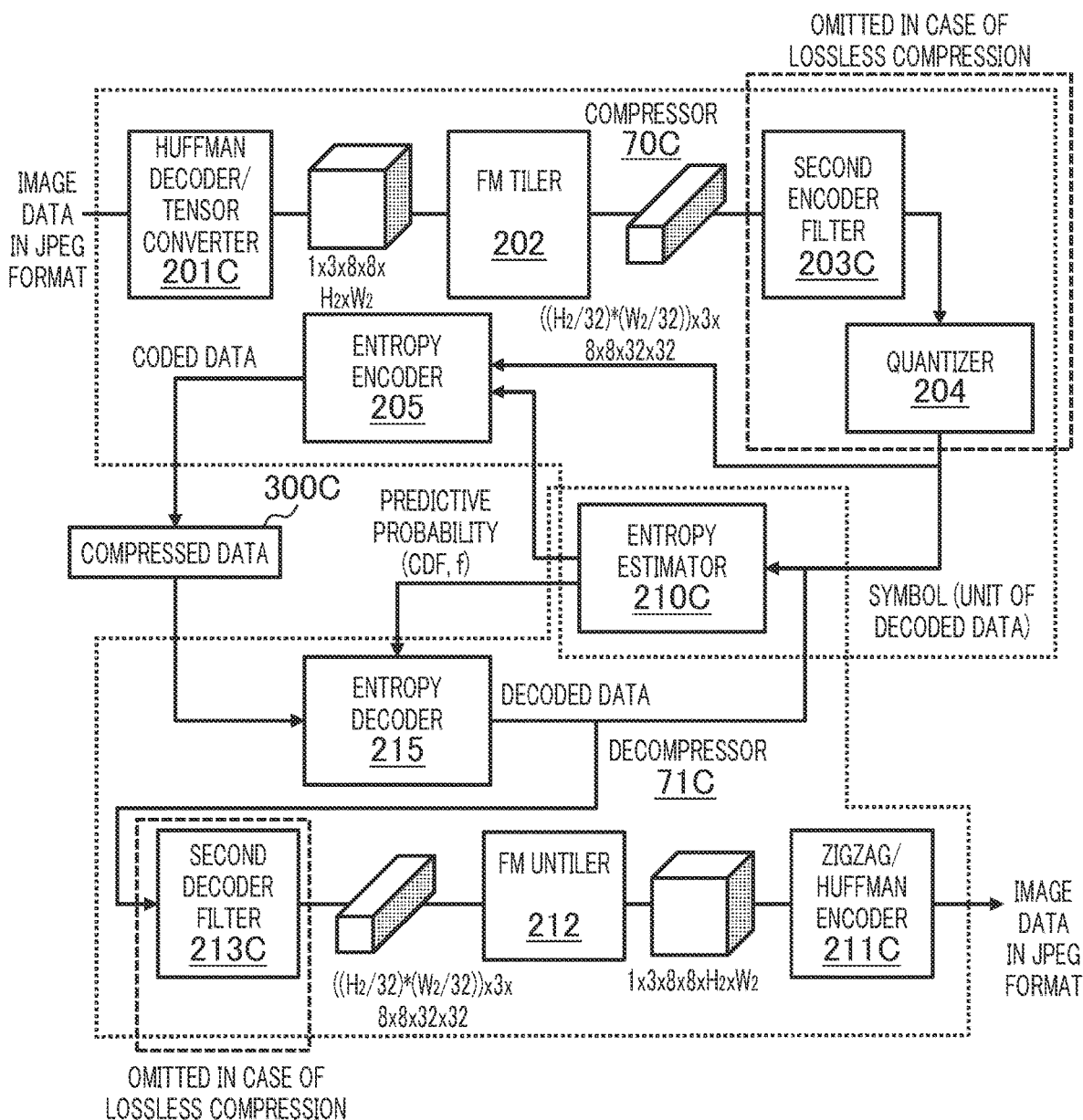
FIG. 17 is a drawing illustrating an exemplary configuration of a data compression and decompression system according to a third embodiment.

FIG. 17 is a drawing illustrating an exemplary configuration of a compressor 70C and a decompressor 71C according to the third embodiment. The compressor 70C includes a Huffman decoder/tensor converter 201C instead of the first encoder filter 201 compared with the compressor 70 according to the first embodiment. Additionally, the decompressor 71C includes a Zigzag/Huffman encoder 211C instead of the first decoder filter 211 compared with the decompressor 71 according to the first embodiment. Additionally, the compressor 70C and the decompressor 71C include an entropy estimator 210C instead of the entropy estimator 210 compared with the compressor 70 and the decompressor 71 according to the first embodiment.

The Huffman decoder/tensor converter 201C performs Huffman decoding on the image data in JPEG format immediately before a discrete cosine inverse transform (DCT) and obtains tensor data having the dimension of DCT (8×8 in the example of FIG. 17) as decoded data. In this embodiment, the tensor data is six dimensions, and has six dimensions, a batch, a channel, a DCT height, a DCT width, a height, and a width. The Huffman decoder/tensor converter 201C performs padding on the tensor data such that the tensor data becomes multiples of the division height (Th)× division width (Tw). In the example of FIG. 17, as the input image, 256 pixels are used as the sizes of Th and Tw.

The FM tiler 202 extends the dimension of batch of the tensor data on which padding has been performed. In the example of FIG. 17, the FM tiler 202 divides the FM having the input size (1×3×8×8×H2×W$_2$) in the tile form in the vertical/lateral directions to set the dimension of the batch and outputs the FM having a size (((H$_2$/32)×(W$_2$/32))×3× 8×8×32×32).

To process the four-dimensional structure, a second encoder filter 203C may use, for example, 4D CNN kernel and 2D+2D CNN kernel. The quantizer 204 is similar to that of the first embodiment. The second encoder filter 203C and the quantizer 204 are omitted in the case of a lossless compression format, such as PNG.

Since the entropy estimator 210C performs entropy estimation on the four-dimensional structure, the entropy estimator 210C uses the 4D CNN kernel, but may use 2D+2D CNN kernel. When a chroma format is except for 4:4:4, the tensor size is different in each of YCbCr. Therefore, channels having the different sizes are divided, the coding process is performed on each of the divided channels, information is mutually exchanged between the channels, and, for example, one restoration result is used as auxiliary information during another decoding. For example, the coding process and the decoding process of data in channels having luminance components Y where data are relatively small are performed prior to channels having a blue color difference Cb and a red color difference Cr where the data are relatively large, information by the coding process or the decoding process of the data in the channel having the luminance component Y is used as the auxiliary information in the coding process or the decoding process in the channel having the blue color difference Cb and the red color difference Cr, and thus the compression can be efficient.

The entropy encoder 205 and the entropy decoder 215 are similar to those of the first embodiment. Since a second decoder filter 213C processes the four-dimensional structure, the second decoder filter 213C may use, for example, the 4D CNN kernel or 2D+2D CNN kernel. The second decoder filter 213C is omitted in the case of a lossless compression format, such as PNG. The FM untiler 212 performs a process inversed to the FM tiler 202 described above. The Zigzag/Huffman encoder 211C performs zigzag coding and Huffman coding on input data to output the JPEG image format.

In the case where the compression target file is in a lossless format, such as PNG, since the DCT unit "8×8" is not present, the compression target file is processed with 2D CNN kernel. The DCT unit "8×8" is not provided as another dimension, but may be coupled to a channel dimension.

Figure 18:
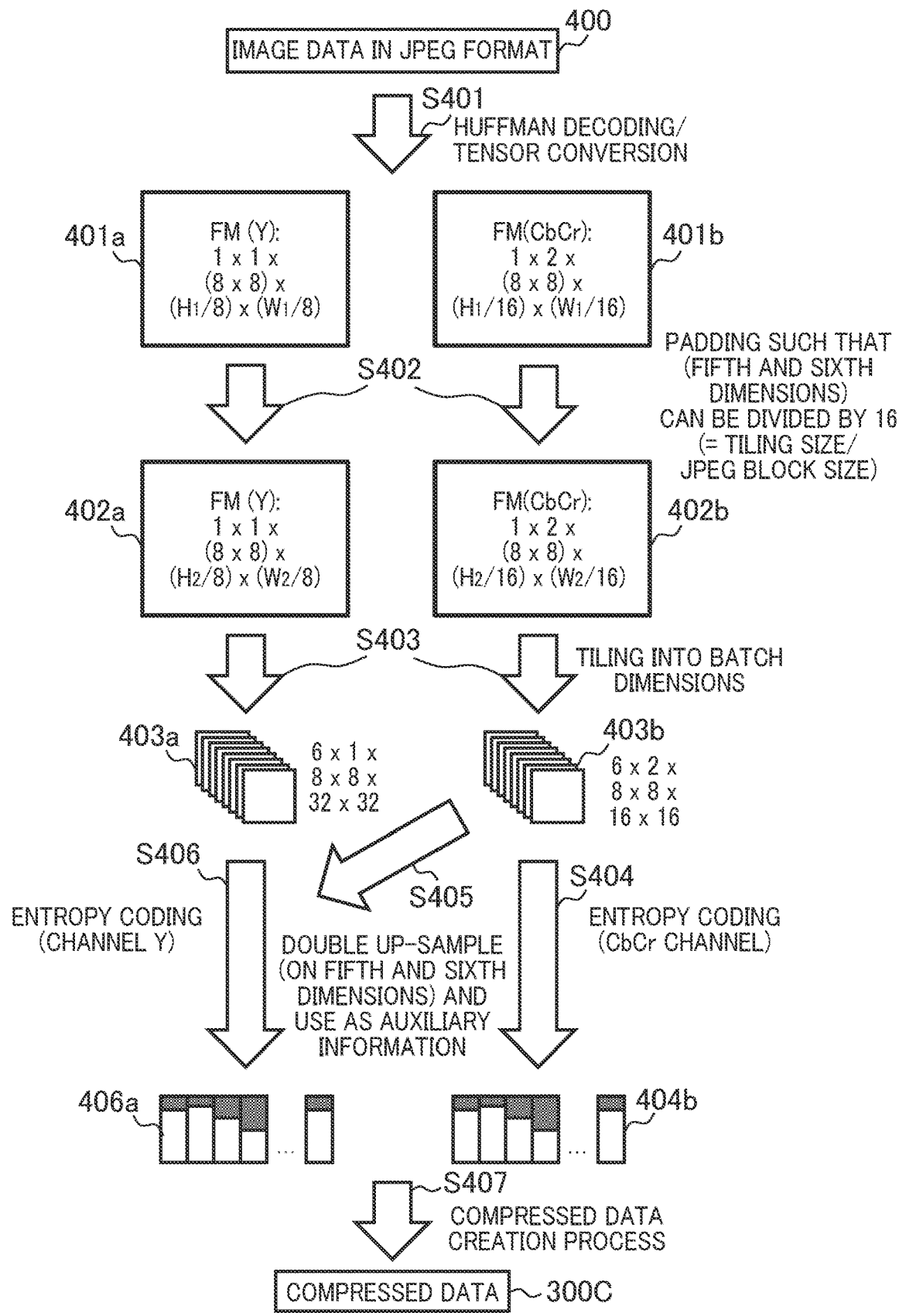
FIG. 18 is a drawing illustrating a compression process example according to the third embodiment.

FIG. 18 is a drawing illustrating a compression process example according to the third embodiment. FIG. 18 illustrates an example in which image data in JPEG format 400 having a chroma format 4:2:0, a height $H_1$=512 pixels, a width $W_1$=768 pixels is used as an input image and tiling is performed at the division height=division width=256 pixels.

In the compression process according to the third embodiment, the compression process is performed by dividing the channels into the channel having the luminance component Y and the channel having the blue color difference Cb and the red color difference Cr.

First, at Step S401, the Huffman decoder/tensor converter 201C performs Huffman decoding on the image data in JPEG format 400 immediately before discrete cosine inverse transform (DCT) and performs conversion into tensor by dividing channels into the channel having the luminance component Y and the channel having the blue color difference Cb and the red color difference Cr. At Step S401, a feature map FM (Y) 401a in the channel having the luminance component Y in the order=1×1×(8×8)×($H_1$/8)×($W_1$/8) is obtained. At Step S401, a feature map FM (CbCr) 401b in the channel having the blue color difference Cb and the red color difference Cr in the order=1×2×(8×8)×($H_1$/16)×($W_1$/16) is obtained. The feature map FM (Y) and the FM (CbCr) have the dimensions in the DCT unit (8×8).

Next, at Step S402, the Huffman decoder/tensor converter 201C performs padding on each of the feature map FM (Y) and the FM (CbCr) such that the fifth and sixth dimensions (($H_1$/8) and ($W_1$/8) in the case of the feature map FM (Y) and ($H_1$/16) and ($W_1$/16) in the case of the feature map FM (CbCr)) can be divided by the tiling size 16 (the division height Th=division width Tw) as the JPEG block size. At Step S402, a feature map FM (Y) 402a in the channel having the luminance component Y in the order=1×1×(8×8)×($H_2$/8)×($W_2$/8) is obtained. At Step S401, a feature map FM (CbCr) 402b in the channel having the blue color difference Cb and the red color difference Cr in the order=1×2×(8×8)× ($H_2$/16)×($W_2$/16) is obtained.

Next, at Step S403, the FM tiler 202 performs tiling to the dimension of batch (the batch number of FM B=6) and obtains a feature map FM (Y) 403a in the channel having the luminance component Y in the order=6×1×(8×8)×32×32 and a feature map FM (CbCr) 403b in the channel having the blue color difference Cb and the red color difference Cr in the order=6×2×(8×8)×16×16.

Note that to perform lossy compression on the image data in JPEG format 400, as illustrated in FIG. 17, the second encoder filter process by the second encoder filter 203 and the quantization process by the quantizer 204 may be performed on the feature map FM (Y) 403a and the feature map FM (CbCr) 403b.

Next, at Step S404, the entropy encoder 205 performs entropy coding on the feature map FM (CbCr) 403b to create a data stream 404b.

Next, at Step S405, the entropy encoder 205 performs, for example, double up-sampling on the fifth and sixth dimensions of the feature map FM (CbCr) 403b when entropy coding is performed and creates the auxiliary information when entropy coding is performed on the feature map FM (Y) 403a.

Next, at Step S406, using the auxiliary information created at Step S405, the entropy encoder 205 performs entropy coding on the feature map FM (Y) 403a to create a data stream 406a.

Since the feature map FM (CbCr) 403b has the data size smaller than that of the feature map FM (Y) 403a, entropy coding is performed on the feature map FM (CbCr) 403b prior to the feature map FM (Y) 403a, and the coding information is used as the auxiliary information for entropy coding of the feature map FM (Y) 403a, thus ensuring improving the compression ratio of the feature map FM (Y) 403a. The feature map FM (CbCr) 403b having the small data size is coded previously and the coding is promptly completed, and thus the auxiliary information can be promptly used for coding of the feature map FM (Y) 403a in another channel.

Next, at Step S407, the entropy encoder 205 performs the compressed data creation process based on the predictive probability (CDF, f) by the entropy estimator 210C to create compressed data 300C from the data streams 406a and 404b.

Note that in FIG. 18, the description has been given with an example of only coding process for each channel, but the configuration is not limited to this. That is, the coding process and the decoding process of the data in the channels where the data are relatively small may be performed prior to the channels where the data are relatively large, and the information by the coding process or the decoding process of the data in the channel on which the process has been performed previously may be used as the auxiliary information in the coding process or the decoding process of another channel.

Figure 19:
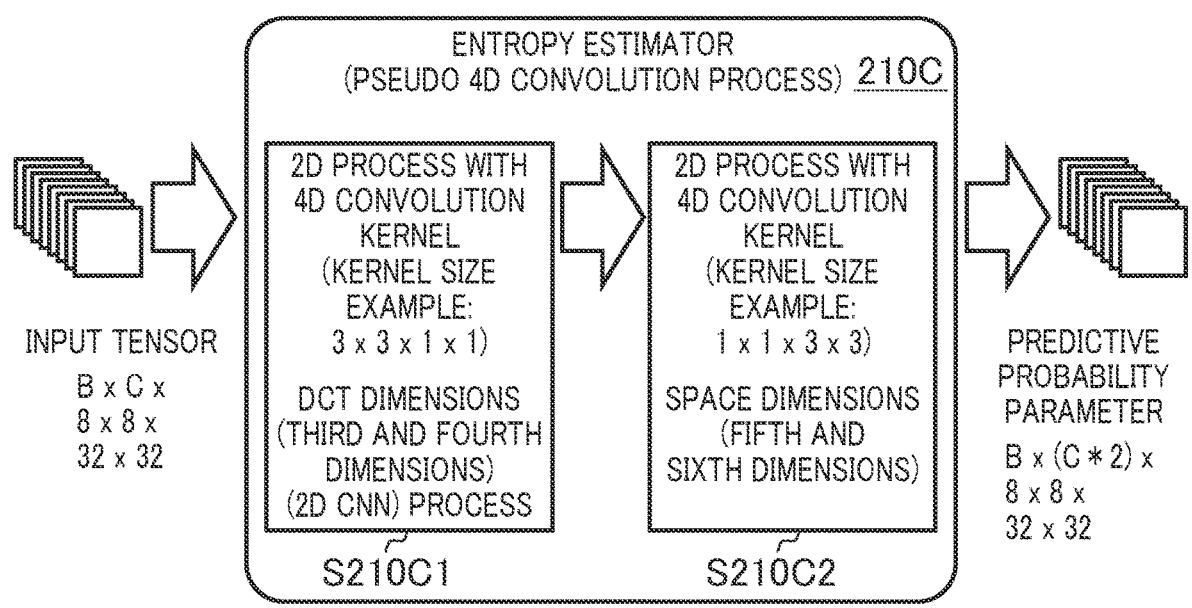
FIG. 19 is a drawing for describing a process example of an entropy estimator according to the third embodiment.

FIG. 19 is a drawing for describing a process example of the entropy estimator 210C according to the third embodiment.

For improvement in processing speed, the entropy estimator 210C performs a four-dimensional (4D) Convolution neural network process on two dimensions among the four dimensions by a 2D Convolution process using kernel of a first two-dimensional neural network. Subsequently, the entropy estimator 210C performs the 2D Convolution process on the remaining two dimensions using the kernel of the second neural network.

For example, with the dimensions of the input tensor being B×C×8×8×32×32, first, the entropy estimator 210C performs a 2D CNN process S210C1 on the DCT dimension (8×8) of the third dimension and the fourth dimension with the kernel size of, for example, 3×3×1×1. Next, the entropy estimator 210C performs a 2D CNN process S210C2 on the space dimension (32×32) of the fifth dimension and the sixth dimension with the kernel the size of, for example, 1×1×3×3. Thus, the entropy estimator 210C receives the input tensor with the dimension B×C×8×8×32×32 and outputs the tensor with the parameter of the dimension B×(C*2)×8×8×32×32 having the two parameters "mean" and "scale" for each of the channels.

Thus, the entropy estimator 210C dividedly performs the four-dimensional (4D) Convolution process into two 2D Convolution processes in phases, thereby ensuring improving the processing speed of entropy prediction.

Note that the present invention is not limited to the above-described embodiments but includes various modifications. For example, the above-described embodiments have been described in detail for ease of understanding of the present invention and is not necessarily limited to the configuration including all of the described configurations. Additionally, the configuration is not limited to removal of the configuration, and replacement and addition of the configuration are also possible. Additionally, a part of or all of configurations of one embodiment may be combined with another embodiment within the scope of not departing from the gist of the invention or not in conflict with the scope.

The above-described respective configurations, functions, processing units, processing means, and the like may be achieved by hardware by, for example, designing a part of or all of them by, for example, an integrated circuit. The present invention can be achieved by a program code of software achieving the functions of these embodiments. In this case, a recording medium recording the program code is provided to a computer, and a processor provided with the computer reads the program code stored in the recording medium. In this case, the program code itself read from the recording medium achieves the above-described functions of these embodiments, and the program code itself and the recording medium storing it constitute the present invention. As the recording medium to supply the program code, for example, a flexible disk, a CD-ROM, a DVD-ROM, a hard disk, a Solid State Drive (SSD), an optical disk, a magnet-optical disk, a CD-R, a magnetic tape, a non-volatile memory card, and a ROM are used. The program code achieving the functions described in these embodiments can be implemented in various programming languages or script languages.

Control lines and information lines considered to be necessary for description are described in the above-described embodiments, and all the control lines or information lines as a product are not necessarily described. All the configurations may be mutually connected.

What is claimed is:

1. A data compression and decompression system comprising:
   a parallel processing device that comprises a memory and a plurality of cores and performs a plurality of processes in parallel,
   wherein the parallel processing device:
      divides original data into a plurality of data by a predetermined unit and stores the plurality of data in the memory,
      predicts probability distributions of the plurality of data in parallel by an entropy estimator comprising a neural network that predicts the probability distribution each of the plurality of data,
      calculates cumulative distribution functions of the probability distributions of each of the plurality of data in parallel,
      performs entropy coding processes on the plurality of data in parallel based on the probability distributions and the cumulative distribution functions to create a plurality of coded data, and
      creates compressed data from the plurality of coded data.

2. The data compression and decompression system according to claim 1, wherein the data compression and decompression system records information of a correspondence relationship between the plurality of coded data and the compressed data, together with the compressed data.

3. The data compression and decompression system according to claim 1,
wherein the parallel processing device configures a compressor on a neural network, and the compressor includes:
a first encoder filter that performs a filter process on the original data to create a feature map;
a divider that divides the feature map created by the first encoder filter by the predetermined unit to create a plurality of the divided feature maps;
a second encoder filter that performs a filter process on the plurality of divided feature maps created by the divider;
an entropy estimator that predicts entropies of the plurality of divided feature maps; and
an entropy coder that performs entropy coding processes on the plurality of divided feature maps in parallel using the predetermined model based on a prediction result of the entropies, and creates the plurality of coded data to create the compressed data from the plurality of coded data.

4. The data compression and decompression system according to claim 1, wherein the parallel processing device:
expands the compressed data to the plurality of coded data,
performs decoding processes on the plurality of coded data after the expansion in parallel using the predetermined model to create a plurality of decoded data, and
couples the plurality of decoded data to create decompressed data of the compressed data.

5. The data compression and decompression system according to claim 4,
wherein the data compression and decompression system expands the compressed data to the plurality of coded data based on information of a correspondence relationship between the plurality of coded data and the compressed data recorded together with the compressed data.

6. The data compression and decompression system according to claim 3,
wherein the parallel processing device configures a decompressor on a neural network, and the decompressor includes:
the entropy estimator;
an entropy decoder that expands the compressed data to the plurality of coded data and performs entropy decoding processes on the plurality of coded data in parallel using the predetermined model based on the prediction result of the entropies to create the plurality of decoded data;
a second decoder filter that performs a filter process on the plurality of decoded data;
a coupler that couples the plurality of decoded data on which the filter process has been performed by the second decoder filter to create a feature map; and
a first decoder filter that performs a filter process on the feature map created by the coupler to create decompressed data of the compressed data.

7. The data compression and decompression system according to claim 1,
wherein the entropy coder is configured using Tensor ANS, and the Tensor ANS replaces predetermined processes in Asymmetric Numeral Systems (ANS) with a tensor operation to allow parallel processing.

8. The data compression and decompression system according to claim 6,
wherein the entropy decoder:
constitutes a tensor from the plurality of divided feature maps and information of a correspondence relationship between the plurality of coded data and the compressed data recorded together with the compressed data, and
performs the entropy decoding processes on the plurality of coded data in parallel based on the tensor.

9. The data compression and decompression system according to claim 3,
wherein the entropy estimator predicts entropy of pixels of an estimation target based on only pixels in a vertical direction with respect to an arrangement direction of the pixels of the estimation target in the plurality of divided feature maps to perform prediction processes of the entropies of the pixels of the respective estimation targets in parallel.

10. The data compression and decompression system according to claim 1, comprising:
a shuffler that randomly changes orders of the plurality of data, the probability distributions predicted by the entropy estimator and the cumulative distribution functions; and
an unshuffler that returns orders of the plurality of data changed by the shuffler to the orders before the change,
wherein the entropy estimator predicts predictive probabilities of the plurality of data,
wherein the entropy coder creates the plurality of coded data based on the plurality of data and the predictive probabilities whose orders have been changed by the shuffler,
wherein the entropy decoder creates the plurality of decoded data based on the predictive probabilities whose orders have been changed by the shuffler, and
wherein the unshuffler returns orders of the plurality of decoded data to the orders before the change.

11. The data compression and decompression system according to claim 4,
wherein when the original data includes a plurality of channels, the parallel processing device separates the plurality of channels, independently performs the coding process and the decoding process on each of the separated channels, and uses information by the coding process or the decoding process of a channel as auxiliary information in the coding process or the decoding process on another channel.

12. The data compression and decompression system according to claim 11,
wherein when the plurality of channels have different data sizes, the parallel processing device performs the coding process and the decoding process on a channel having a data size smaller than a predetermined size in the original data prior to another channel, and the parallel processing device uses information by the coding process or the decoding process as the auxiliary information in the coding process or the decoding process on the other channel.

13. The data compression and decompression system according to claim 3,
wherein when the entropy estimator predicts the entropy of a four-dimensional neural network, the entropy estimator uses a kernel of a first two-dimensional neural network for two dimensions among the four dimensions and uses a kernel of a second two-dimensional neural network for remaining two dimensions among the four dimensions.

14. A data compression and decompression method performed by a data compression and decompression system including a parallel processing device that comprises a memory and a plurality of cores and performs a plurality of processes in parallel, the method comprising:
processes performed by the parallel processing device comprising:
dividing original data into a plurality of data by a predetermined unit and stores the plurality of data in the memory;
predicting probability distributions of the plurality of data in parallel by an entropy estimator comprising neural network that predicts the probability distribution each of the plurality of data;
calculating cumulative distribution functions of the probability distributions each of the plurality of data in parallel;
performing entropy coding processes on the plurality of data in parallel based on the probability distributions and the cumulative distribution functions to create a plurality of coded data; and
creating compressed data from the plurality of coded data.

15. The data compression and decompression method according to claim 14,
wherein the method further comprises processes executed by the parallel processing device comprising:
expanding the compressed data to the plurality of coded data;
performing decoding processes on the plurality of coded data after the expansion in parallel using the predetermined model to create a plurality of decoded data; and
coupling the plurality of decoded data to create decompressed data of the compressed data.

* * * * *